(12) United States Patent
Fleming et al.

(10) Patent No.: US 10,997,322 B2
(45) Date of Patent: *May 4, 2021

(54) EFFICIENT POWER DISTRIBUTION

(71) Applicant: Arm Limited, Cambridge (GB)

(72) Inventors: Adeline-Fleur Fleming, Duxford (GB); Carl Wayne Vineyard, Cedar Park, TX (US); George Mcneil Lattimore, Austin, TX (US); Christopher Neal Hinds, Austin, TX (US); Robert John Harrison, Sheffield (GB); Mikael Rien, Bernin (FR); Abdellah Bakhali, Grenoble (FR); Robert Christiaan Schouten, Grasse (FR); Jean-Charles Bolinhas, Grenoble (FR)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,900

(22) Filed: May 1, 2018

(65) Prior Publication Data
US 2018/0336372 A1    Nov. 22, 2018

Related U.S. Application Data

(63) Continuation-in-part of application No. 15/600,974, filed on May 22, 2017.

(51) Int. Cl.
*G06F 21/75* (2013.01)
*H02J 7/00* (2006.01)
(Continued)

(52) U.S. Cl.
CPC ............ *G06F 21/755* (2017.08); *H01L 27/00* (2013.01); *H02J 7/0013* (2013.01); *H02J 7/0068* (2013.01);
(Continued)

(58) Field of Classification Search
CPC ............ G06F 17/5045; G06F 17/5068; G06F 2217/78; G06F 21/60; G06F 21/577;
(Continued)

(56) References Cited

U.S. PATENT DOCUMENTS

| 5,357,419 A | 10/1994 | Limpaecher |
|---|---|---|
| 5,905,361 A | 5/1999 | Saeki |

(Continued)

FOREIGN PATENT DOCUMENTS

WO    2010/008586 A2    1/2010

OTHER PUBLICATIONS

A. Gornik et al, "A Hardware-based countermeasure to reduce side channel leakage—Design, Implementation, and Evaluation" in IEEE Transactions on Computer-Aided Design of Integrated Circuits and Systems, vol. 34 No. 8. Aug. 2015, pp. 1308-1319 (Year: 2015).*

(Continued)

*Primary Examiner* — Saleh Najjar
*Assistant Examiner* — Khalid M Almaghayreh
(74) *Attorney, Agent, or Firm* — Nixon & Vanderhye P.C.

(57) ABSTRACT

An apparatus is provided to enable power supply input to be isolated from power supply output. Power is received from a first power signal at a first of a plurality of charge stores. A second power signal is output from a second of the plurality of charge stores. The second power signal is isolated from the first power supply. The first charge store can be charged from the power input whilst isolated from the power output. The second charge store can be discharged to the power output, while isolated from the power input.

21 Claims, 16 Drawing Sheets

(51) Int. Cl.
  *H03K 5/24* (2006.01)
  *H01L 27/00* (2006.01)
  *H02J 7/34* (2006.01)
  *H03K 17/687* (2006.01)
  *H03K 3/03* (2006.01)

(52) U.S. Cl.
  CPC .............. *H02J 7/342* (2020.01); *H03K 5/24* (2013.01); *H02J 7/345* (2013.01); *H03K 3/0315* (2013.01); *H03K 17/6872* (2013.01)

(58) Field of Classification Search
  CPC . G06F 1/26; G06F 1/04; G06F 21/755; G05F 3/02; H04L 9/003; G11C 5/14
  USPC ....... 716/109, 120, 127, 133; 726/23, 25, 34
  See application file for complete search history.

(56) References Cited

U.S. PATENT DOCUMENTS

| | | | |
|---|---|---|---|
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,381,699 B2 | 4/2002 | Kocher et al. | |
| 6,424,585 B1 * | 7/2002 | Ooishi | G11C 5/143 365/189.09 |
| 6,510,518 B1 | 1/2003 | Jaffe et al. | |
| 6,539,092 B1 | 3/2003 | Kocher | |
| 6,625,737 B1 | 9/2003 | Kissell | |
| 6,654,884 B2 | 11/2003 | Jaffe et al. | |
| 6,976,178 B1 | 12/2005 | Kissell | |
| 6,985,024 B2 * | 1/2006 | Geen | H02M 3/07 307/110 |
| 7,318,145 B1 | 1/2008 | Stribaek et al. | |
| 7,453,285 B2 | 11/2008 | Kiel et al. | |
| 7,506,165 B2 | 3/2009 | Kocher et al. | |
| 7,583,113 B2 | 9/2009 | Celani | |
| 7,587,044 B2 | 9/2009 | Kocher et al. | |
| 7,599,488 B2 | 10/2009 | Kocher et al. | |
| 7,620,832 B2 | 11/2009 | Kissell | |
| 7,634,083 B2 | 12/2009 | Kocher et al. | |
| 7,668,310 B2 | 2/2010 | Kocher et al. | |
| 7,787,620 B2 | 8/2010 | Kocher et al. | |
| 7,792,287 B2 | 9/2010 | Kocher et al. | |
| 7,880,339 B2 * | 2/2011 | Tokunaga | G06F 21/556 307/115 |
| 7,925,814 B2 | 4/2011 | Schneiderwind | |
| 7,941,666 B2 | 5/2011 | Kocher | |
| 8,247,924 B1 * | 8/2012 | Zoller | H02J 9/061 307/80 |
| 8,330,493 B2 | 12/2012 | Myers et al. | |
| 8,386,800 B2 | 2/2013 | Kocher et al. | |
| 8,525,545 B1 * | 9/2013 | May | G06F 21/81 326/8 |
| 8,707,052 B2 | 4/2014 | Kocher et al. | |
| 8,860,465 B2 | 10/2014 | Myers et al. | |
| 8,879,724 B2 | 11/2014 | Kocher et al. | |
| 8,912,814 B2 | 12/2014 | Yannette et al. | |
| 8,912,816 B2 * | 12/2014 | Yannette | H03K 19/003 326/8 |
| 8,947,048 B2 * | 2/2015 | Roessler | H02J 7/0016 320/116 |
| 8,977,864 B2 | 3/2015 | Kocher et al. | |
| 9,143,005 B1 * | 9/2015 | Laird | G11C 5/141 |
| 9,154,132 B2 * | 10/2015 | Yannette | G09C 1/00 |
| 9,312,861 B2 | 4/2016 | Myers et al. | |
| 9,430,678 B2 | 8/2016 | Yannette et al. | |
| 9,778,669 B2 * | 10/2017 | Kim | G05F 1/468 |
| 2003/0210018 A1 * | 11/2003 | Tscheternigg | G06K 19/073 320/166 |
| 2005/0024962 A1 * | 2/2005 | Chan | G11C 5/145 365/202 |
| 2008/0044041 A1 * | 2/2008 | Tucker | H03F 1/025 381/120 |
| 2008/0150619 A1 * | 6/2008 | Lesso | H02M 3/07 327/536 |
| 2008/0150620 A1 * | 6/2008 | Lesso | H02M 3/07 327/536 |
| 2008/0150621 A1 * | 6/2008 | Lesso | H02M 3/07 327/536 |
| 2009/0135171 A1 * | 5/2009 | Chen | G09G 3/3655 345/211 |
| 2012/0001683 A1 * | 1/2012 | Wang | H02M 3/073 327/536 |
| 2012/0139577 A1 * | 6/2012 | Lee | H01L 23/5223 326/8 |
| 2014/0132337 A1 * | 5/2014 | Yannette | H04L 9/003 327/534 |
| 2014/0167837 A1 * | 6/2014 | Yannette | G06F 21/755 327/534 |
| 2016/0109933 A1 * | 4/2016 | Damle | G06F 1/30 713/323 |
| 2017/0063376 A1 * | 3/2017 | Bell | H04L 9/004 |
| 2017/0310120 A1 | 10/2017 | Birkl | |

OTHER PUBLICATIONS

"Gornik et al., A Hardware-based Countermeasure to Reduce Side-Channel Leakage, 2015, IEEE" (Year: 2015).*
International Search Report and Written Opinion of the International Searching Authority dated Aug. 16, 2018 in PCT/GB2018/051379, 12 pages.
U.S. Appl. No. 15/600,974, filed May 22, 2017, Inventor: Harrison et al.
Office Action dated February 25, 2019 in co-pending U.S. Appl. No. 15/600,974, 22 pages.
Final Office Action dated Oct. 18, 2019 in co-pending U.S. Appl. No. 15/600,974, 25 pages.
Office Action dated Apr. 3, 2020 for U.S. Appl. No. 15/600,974, 22 pages.
A. Gornik et al, "A Hardware-based Countermeasure to Reduce Side-Channel Leakage—Design, Implementation, and Evaluation" in IEEE Transactions on Computer-Aided Design of Integrated Circuits and Systems, vol. 34, No. 8, Aug. 2015, pp. 1308-1319.
Office Action for EP Application No. 18729485.5 dated Dec. 11, 2020, 4 pages.

* cited by examiner

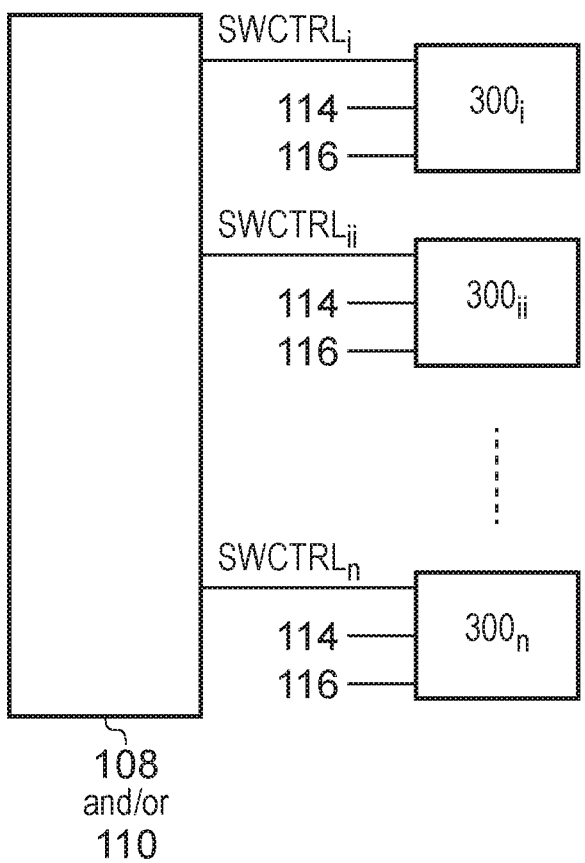
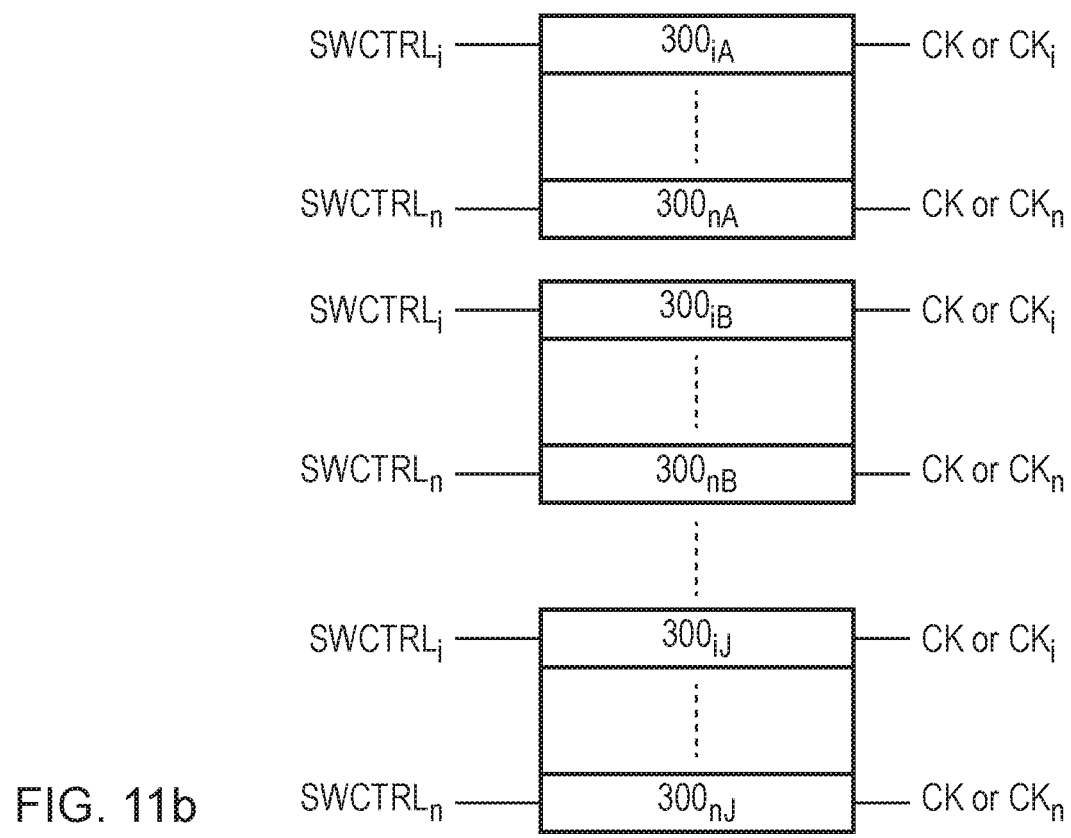
FIG. 11a
FIG. 11b

EFFICIENT POWER DISTRIBUTION

This application is a continuation-in-part of U.S. application Ser. No. 15/600,974, filed 22 May 2017, the entire contents of which is hereby incorporated by reference.

BACKGROUND

The security of electronic circuitry is becoming increasingly important and there is an increasing concern around vulnerabilities to side channel attacks. Side channel attacks aim to determine information about a system by analyzing changes to physical parameters of a system while it is in operation. For example, power or energy changes may be monitored over time to try to identify when, a security or safety critical function is performed during the execution of code.

BRIEF DESCRIPTION OF THE DRAWINGS

Implementations of various techniques are described herein with reference to the accompanying drawings. It should be understood, however, that the accompanying drawings illustrate only various example implementations described herein and are not meant to limit embodiments of various techniques described herein.

FIG. 11a illustrates a block diagram in accordance with various example implementations described herein.

FIG. 11b illustrates a block diagram in accordance with various example implementations described herein.

DESCRIPTION OF EXAMPLE EMBODIMENTS

Figure 1:
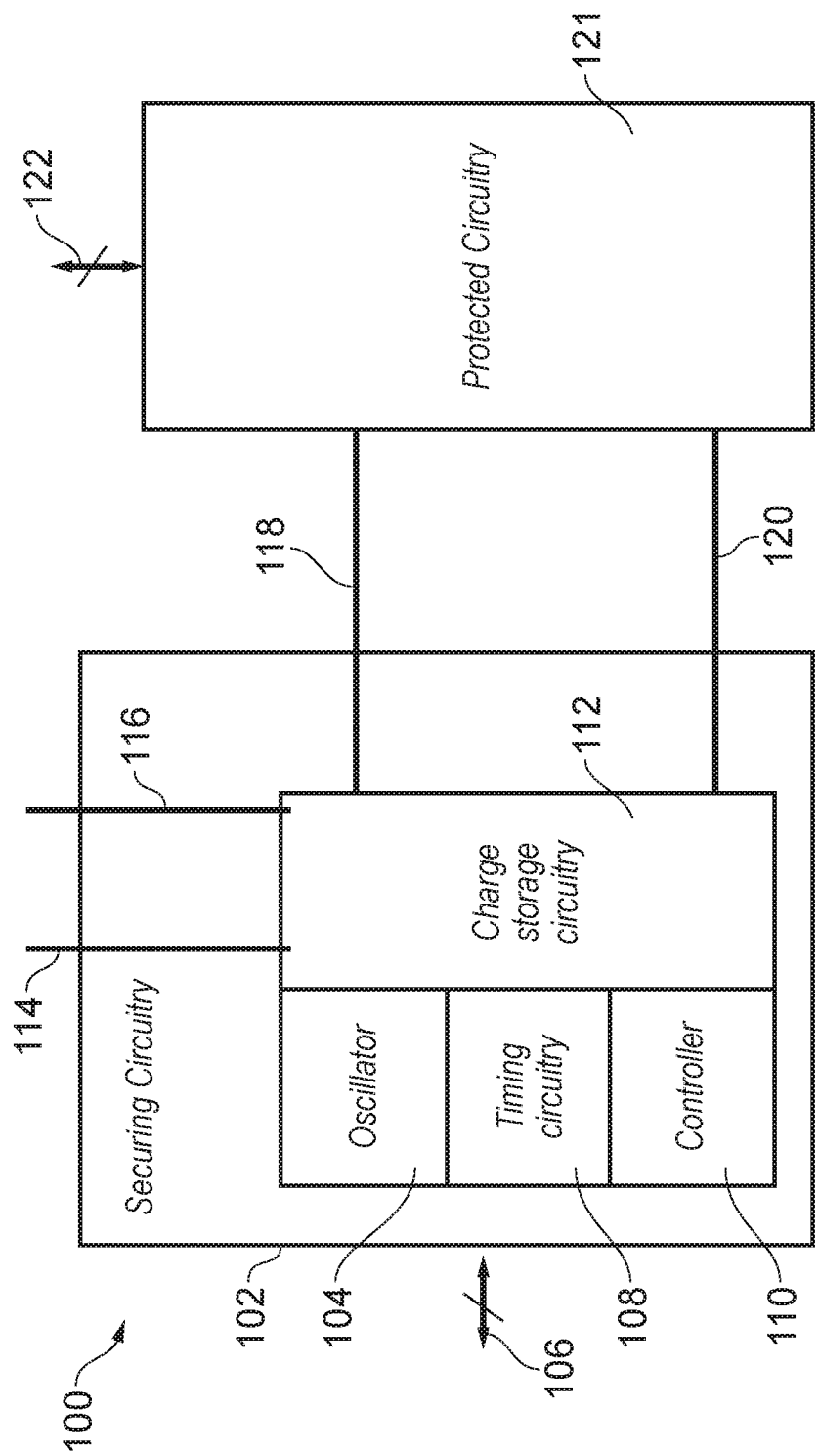
FIG. 1 illustrates a block diagram in accordance with various example implementations described herein.

In the description that follows, the scope of the term "some embodiments" is not to be so limited as to mean more than one embodiment, but rather, the scope may include one embodiment, more than one embodiment, or perhaps all embodiments. Throughout the description and figures like reference numerals are used to refer to like elements respectively.

FIG. 1 is a block diagram of a system 100 in accordance with some example embodiments. The system 100 comprises securing circuitry 102 and protected circuitry 121. The securing circuitry 102 is configured to provide as an output a plurality of local power signals 118, 120 which are received as an input by the protected circuitry 121. The securing circuitry 102 comprises an oscillator 104, timing circuitry 108, a controller 110, and charge storage circuitry 112. The charge storage circuitry is configured to receive as an input a plurality of system on chip (SOC) power signals 114, 116 and provide as an output the plurality of local power signal 118, 120. The securing circuitry is further configured to receive at least one control signal 106. The protected circuitry 121 is further configured to receive at least one control signal 122.

In some example embodiments, the charge storage circuitry, may be configured to provide isolated power to the protected circuitry. This may be achieved by using a plurality of charge storage devices, for example capacitors. These capacitors may be charged from the global power supply lines and then discharged via the local or isolated power supply lines. In order to ensure that the local power supply lines are isolated from the global power supply lines, a network of switches may selectively couple and decouple the plurality of capacitors to the global power supply lines and to the local power supply lines. The switches are controlled by the controller such that when operating in a protected mode, the capacitors are coupled to one of the global or local power supply lines at any time. In other words, when charge store is being charged using the global supply lines, it is not electrically connected to the local power supply lines. Similarly, when a charge store is providing power to the protected circuitry, it is not electrically connected to the global power supply lines. The example embodiments described below show various example arrangements of the charge stores and switches, where one or more charge stores may continue to supply the protected circuitry while one or more further charge stores may be charged or recharged by the global power supply.

The decoupling or isolation of the protected circuitry from the global power supply may reduce the vulnerability of the protected circuitry to side channel attacks by limiting the visibility on the global supply lines of voltage, current or power variation caused by switching or processing within the protected circuitry. Instead the variation of power, current or voltage visible on the global supply lines may be dependent on the charging cycles or schemes of the plurality of charge storage circuits within the charge storage circuitry portion of the securing circuitry as well as the power requirements of the securing circuitry itself.

In some example embodiments, the charge storage circuitry may be used to power the securing circuitry as well as the protected circuitry.

In some example embodiments, the securing circuitry may provide power or energy to the protected circuitry at a constant level.

Figure 2:
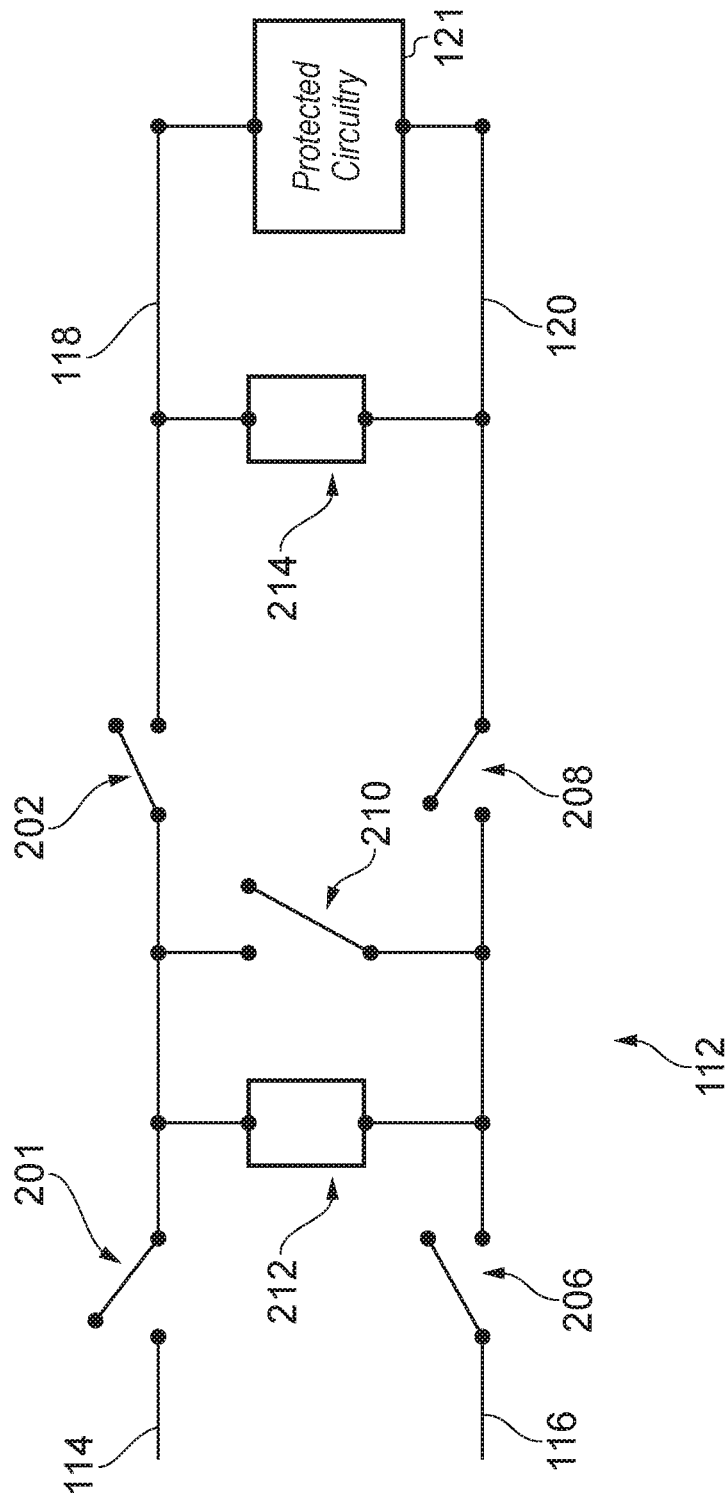
FIG. 2 illustrates a block diagram in accordance with various example implementations described herein.

FIG. 2 shows a charge storage circuitry in accordance with some embodiments. A first switch 201, is coupled to the first global power signal 114, and a second switch 206 is coupled to the second global power signal 116. A first charge store 212 and a third switch 210 are coupled in parallel between the outputs of the first and second switches 201, 206. A fourth switch 202 is coupled to the first terminal of the third switch 210 and a fifth switch 208 is coupled to the second terminal of the third switch 210 such that the fourth 202 and fifth 208 switches are arranged in parallel to one another and in series to the first 206 and second 208 switches respectively. A second charge store 214 is coupled between the outputs of the fourth 202 and fifth 208 switches. The first terminal of the second charge store 214 is coupled to the first local power signal 118. The second terminal of the second charge store 214 is coupled to the second local power signal 120. FIG. 2 also shows the protected circuitry 121.

In some example embodiments, the five switches 201, 202, 206, 208, 210 may control the charging coupling and discharging cycles of the charge stores 212, 214. In some example embodiments, the charge stores 212, 214 may provide the power to the protected circuitry 121.

In some example embodiments, the power cycle may operate using a set of charging stages. In some example embodiments, in the first charging stage, the third switch 210 is open and first, second, fourth and fifth switches 201, 202, 206 and 208 are closed. In this charging stage, the global power signals 114, 116 provide power to the protected circuitry 121 via the local power signals 118, 120. The global power signals also charge the first and second charge stores 212, 214. In some example embodiments, the first charging stage may be referred to as a bypass mode. In some example embodiments, the first charging stage may be referred to as a low power mode.

In a second charging stage, the third, fourth and fifth switches, 202, 208,210 are open and the first and second switches 201, 206 are closed. In the second charging stage, the protected circuitry 121 is powered by the second charge store 214 while the first charge store 212 is recharged from the global power supply.

In a third charging stage, the first, second and third switches, 201, 206, 210 are open and the fourth and fifth switches 202, 208 are closed. In the third charging stage, the protected circuitry is powered by at least one of the first and second charge stores 212, 214. The first charge store 212 also charges the second charge store 214.

In some example embodiments, the charging circuitry may switch between the second and third charging stages while operating in the protected mode. In a refresh state, the first, second, fourth and fifth switches 201, 202, 206, 208 are open and the third switch 210 is closed. In this state, the first charge store 212 is discharged.

In some example embodiments, the refresh state may be used to refresh the charge held in the first charge store. In some example embodiments, the refresh state may be used to discharge both the first and second charge store before entering an unprotected state. In some example embodiments by discharging the remaining charge left on the charge store may be moved to ground. In some example embodiments, the first charge store may be a discharged charge store or discharged capacitor arranged to be charged by the global power supply or system on chip power supply.

In some example embodiments the second charge store may be a core hold charge store or core hold capacitor arranged to supply the power to the protected circuitry or protected cryptography engines when the securing circuitry is enabled. By starting with a charge store that has just been discharged the energy or charge applied to the capacitor when it is connected to the chip power supply may be a constant when the capacitor is re-charged.

In some example embodiments, the refresh state may comprise at least one of a shunt state or a discharge state.

In some example embodiments, the first capacitor may be decoupled from the global and local power supplies during the refresh state. In these embodiments, the charge held within the capacitor will equalize across the capacitor and the voltage across the capacitor will halve.

In some example embodiments, the switch 210 may be designed to have a large resistance to aid removing power from the capacitor.

In some example embodiments, the oscillator may provide a source clock signal to the controller. In some embodiments the controller control and/or time a plurality of switching signals to control the plurality of switches within the charge storage circuitry.

In some example embodiments, the charge storage circuitry may be arranged to selectively couple one or more of the charge stores to the protected circuitry.

In some example embodiments, the securing circuitry or secure frame may reduce the correlation between the power consumed by the protected logic and the power the system supplies for the charging of C2.

In some example embodiments, at least charge store 214 is initially charged using the global power supply. The charge store 214 and the protected are then isolated from the global power supply. As the charge store 214 discharges to provide isolated power to the protected circuitry, the other charge store 212 remains coupled to the global power supply to remain charged. Once the charge in the charge store 214 has dropped below a threshold, the other charge store 212 is also isolated from the global power supply and coupled to the charge store 214 and the protected circuitry. The other charge store 212 is then used to recharge the charge store 214 and power the protected circuitry. Once the charge in the charge store has exceeded a further threshold, the other charge store is decoupled from the charge store 214 and the protected circuitry 121, the charge store 212 is then discharged first and then recoupled to the global power supply. This means that while in the protected mode the protected circuitry remains isolated from the global power supply.

In some example embodiments, the charge store 212 may comprise a plurality of capacitors capable of being coupled in parallel while coupled to the global power supply and in coupled in series while coupled to the protected circuitry.

In some example embodiments, the charge store 212 may comprise a plurality of capacitors capable of being coupled in series while coupled to the global power supply and in parallel while coupled to the protected circuitry.

Figure 5:
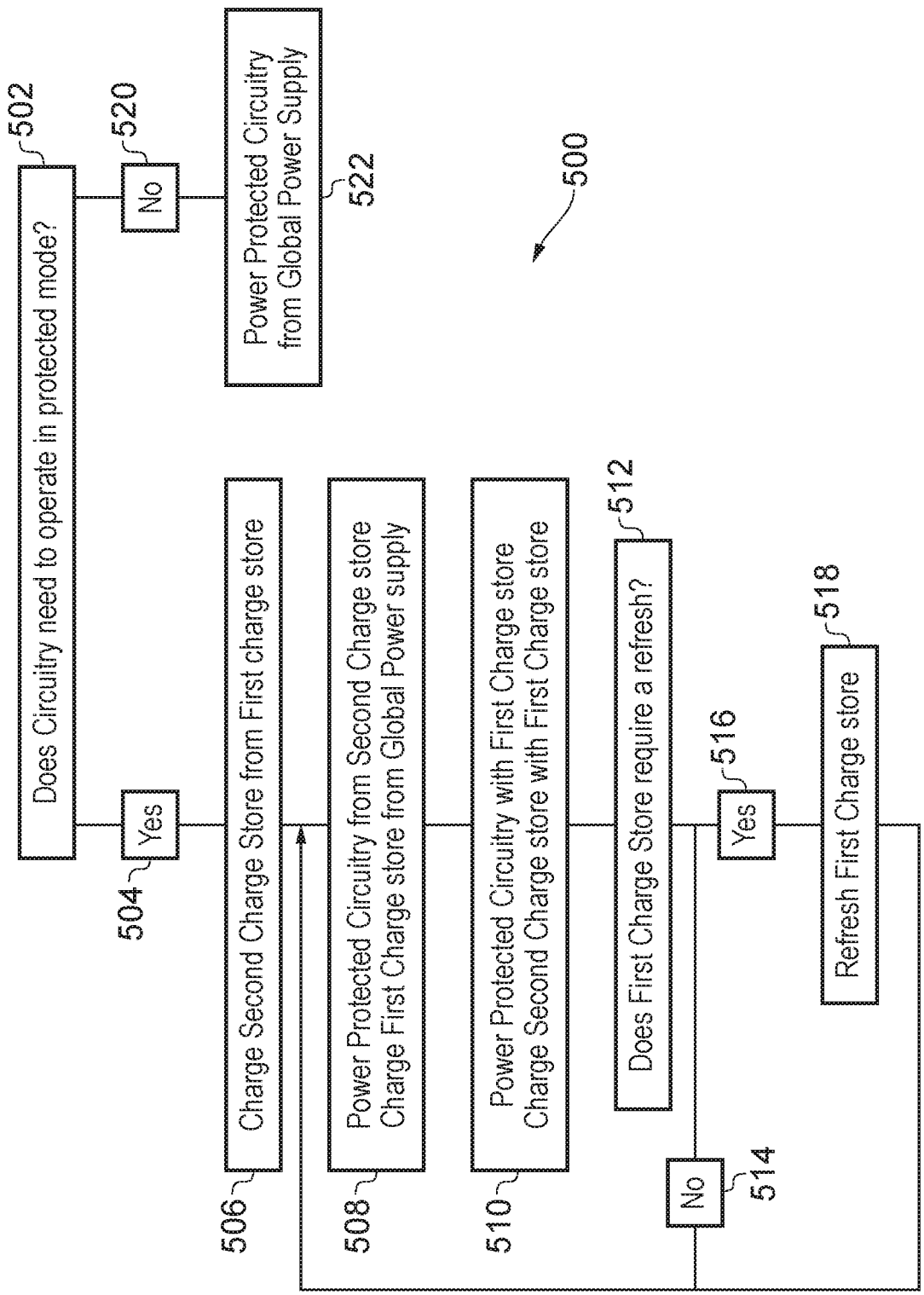
FIG. 5 illustrates a method in accordance with various example implementations described herein.

FIG. 5 shows a flow diagram of a method 500 in accordance with some example embodiments. A determination is made as to whether the circuitry needs to operate in a protected mode 502. If the circuitry needs to operate in the protected mode 504; a second charge store is charged from a first charge store 506. The second charge store is then used to power the protected circuitry while the first charge store is charged from the global power supply 508. The protected circuitry is then powered by the first charge store while simultaneously recharging the second charge store using the first charge store 508. The flow then determines when the first charge store needs to be refreshed 512. If the first charge store does need to be refreshed 514, the flow returns to 508.

If the circuitry does need to be refreshed 516, the first charge store is refreshed 518. If the result of the determination at 502 that the circuitry does not need to operate in the protected mode 520; the protected circuitry is powered using the global power supply 522.

In some example embodiments, the global power supply for the unprotected mode may be provided by the charging circuitry. In some example embodiments, the global power supply for the unprotected mode may be provided directly to the protected circuitry.

In some example embodiments, the second charge store may have been charged by the global power supply prior to entering the protected mode. In these embodiments, step 506 may be optional.

Figure 3A:
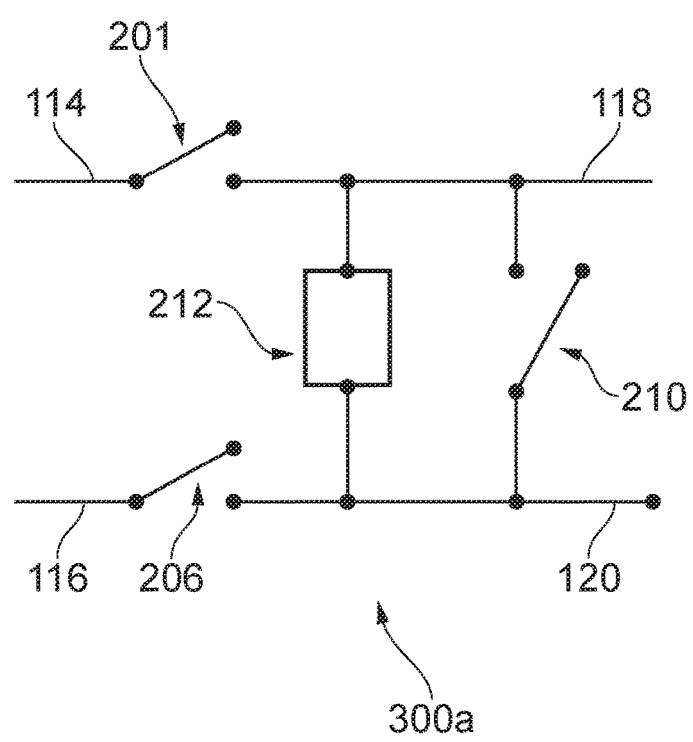
FIG. 3a illustrates a block diagram in accordance with various example implementations described herein.

FIG. 3a shows a first powering unit in accordance with some embodiments. The first powering unit 300a is arranged to receive as a first input the first global power signal 114 and as a second input the second global power signal 116. A first switch 201 is arranged to selectively couple the first global power signal 114 to a first terminal of a charge store 212. A second switch 206 is arranged to selectively couple the second global power signal 116 to a second terminal of a charge store 212. A third switch 210 is arranged to selectively couple the first terminal of the charge store 212 to the second terminal of the charge store 212. In some example embodiments, this may cause a refresh, shunt or discharge of the charge store 212. The first terminal of the charge store is configured to provide as an output a first local power signal 118. The second terminal of the charge store 212 is configured to provide as an output a second local power signal 120. The powering unit 300a may output the first and second local power signals 118, 120 to the protected circuitry.

Figure 3B:
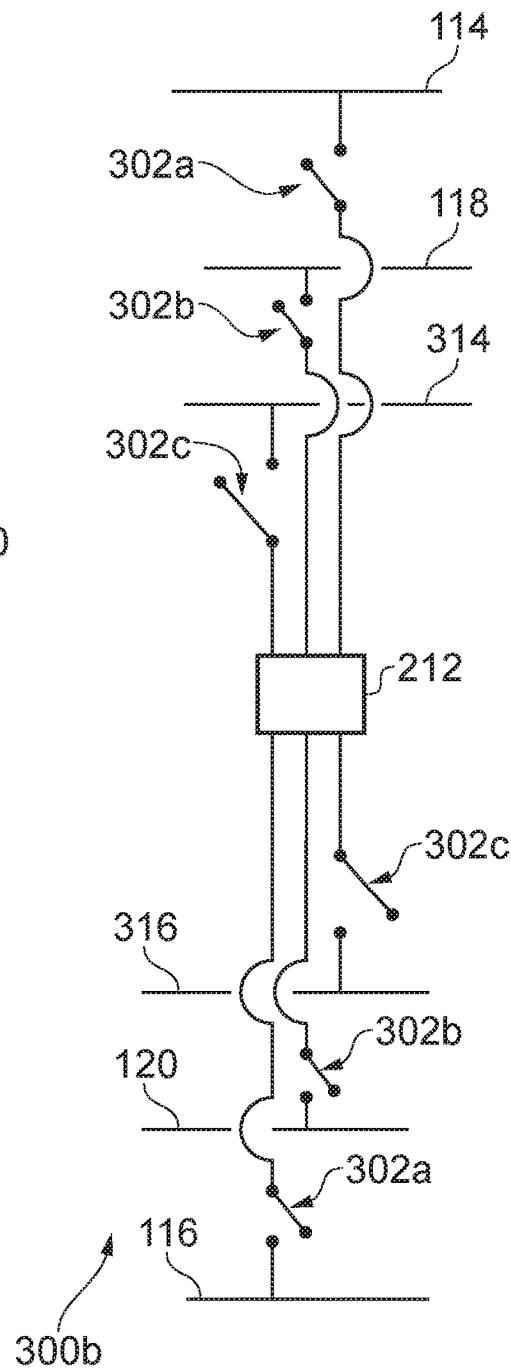
FIG. 3b illustrates a block diagram in accordance with various example implementations described herein.

FIG. 3b shows a second powering unit in accordance with some other example embodiments. The second powering unit 300b is arranged to receive as a first input the first global power signal 114 and as a second input the second global power signal 116. A first pair of switches 302a, are arranged to selectively couple the first global power signal 114 to a first terminal of a charge store 212 and the second global power signal 116 to a second terminal of a charge store 212 respectively. A second pair of switches 302b are arranged to selectively couple the first terminal of the charge store 212 to the first local power signal 118 the second terminal of a charge store 212 and the second local power signal 120 respectively. A third pair of switches 302c are arranged to selectively couple the first and second terminal of the charge store 212 to shunt system 314, 316.

In some example embodiments, the shunt system may be a shunt ring where shunt terminals 314, 316 are coupled together.

In some example embodiments, the shunt terminals 314 & 316 are coupled to other charge stores but not one another. This may enable a plurality of charge stores to share charge with one another while avoiding coupling the terminals of a particular charge store together. Some embodiments may comprise a at least one of the first powering units 300a configured to provide a power to the protected circuitry. Some embodiments may comprise at least one of the second powering units 300b to provide power to the protected circuitry. Some embodiments may comprise at least one of the first powering units 300a and at least one of the second powering units 300b to provide power to the protected circuitry.

Some example embodiments of the powering units 300a, 300b may comprise a plurality of charge stores arranged such one or more may be selectable during operation. The selection of the charge stores may be dependent on a power requirement of the protected circuitry.

Some example embodiments may be configured to select dynamically select the number of charge stores in use at a given time.

Figure 4:
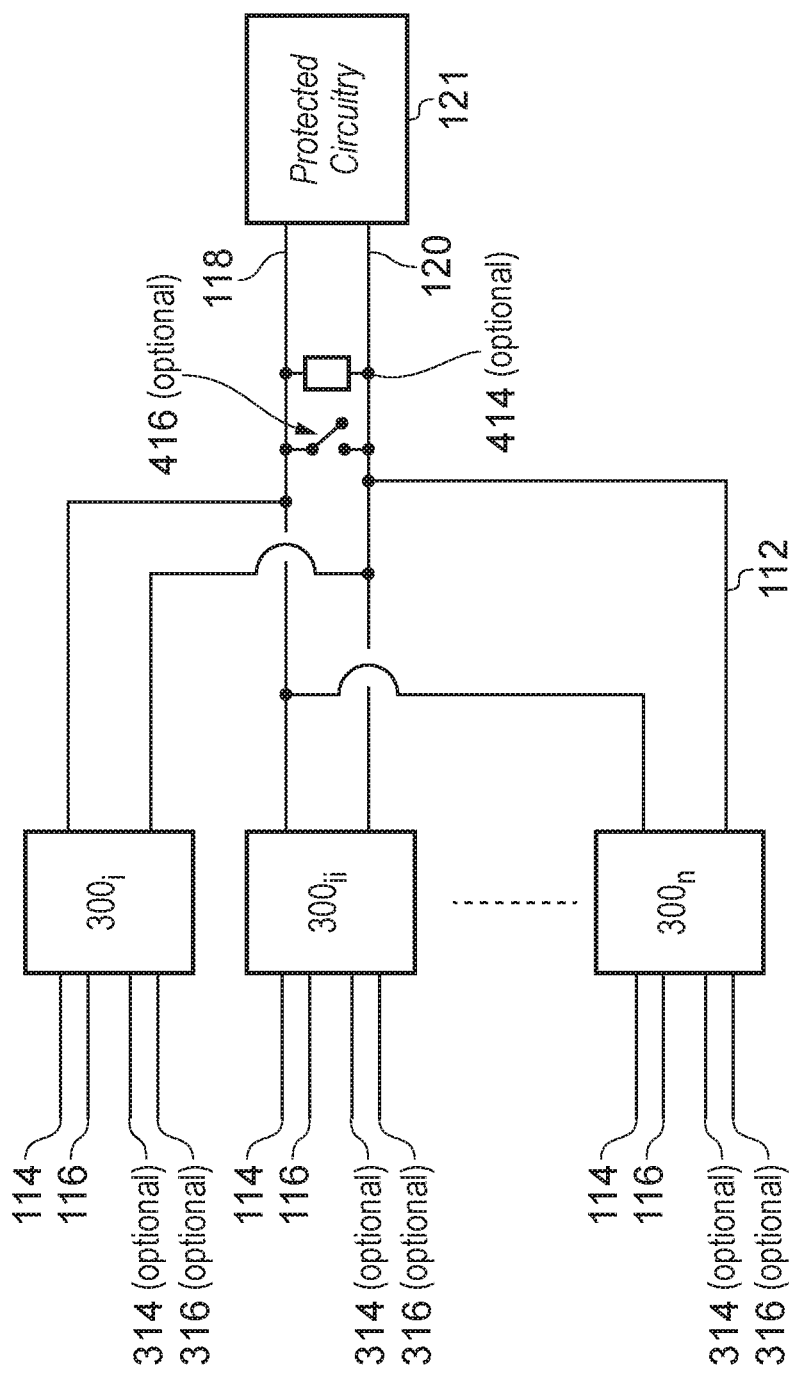
FIG. 4 illustrates a block diagram in accordance with various example implementations described herein.

FIG. 4 shows the charge storage circuitry 112 comprising a plurality of the powering units $300_i$, $300_{ii}$ . . . $300_n$ in accordance with some example embodiments. Each of the plurality of powering units 300 is configured to receive the global power signals 114, 116 as an input. The powering units 300 are also optionally configured to receive the signals from the shunt loop 314, 316. The outputs of the powering units 300 are combined into the local power supplies 118, 120 and provided to the protected circuitry. The switches within the powering units may be controlled by the controller 110. Some example embodiments may also comprise a further optional switch 416 and optional charge store 414 arranged between the outputs of the powering units 300 and the local power supplies 118, 120. The optional switch 416 and the optional charge store 414 are arranged in parallel with their respective first terminals coupled to the first local power supply 118 and their respective second terminals coupled to the second local power supply 120. The powering units 300 may be powering units 300a or 300b or a combination of both.

Figure 6:
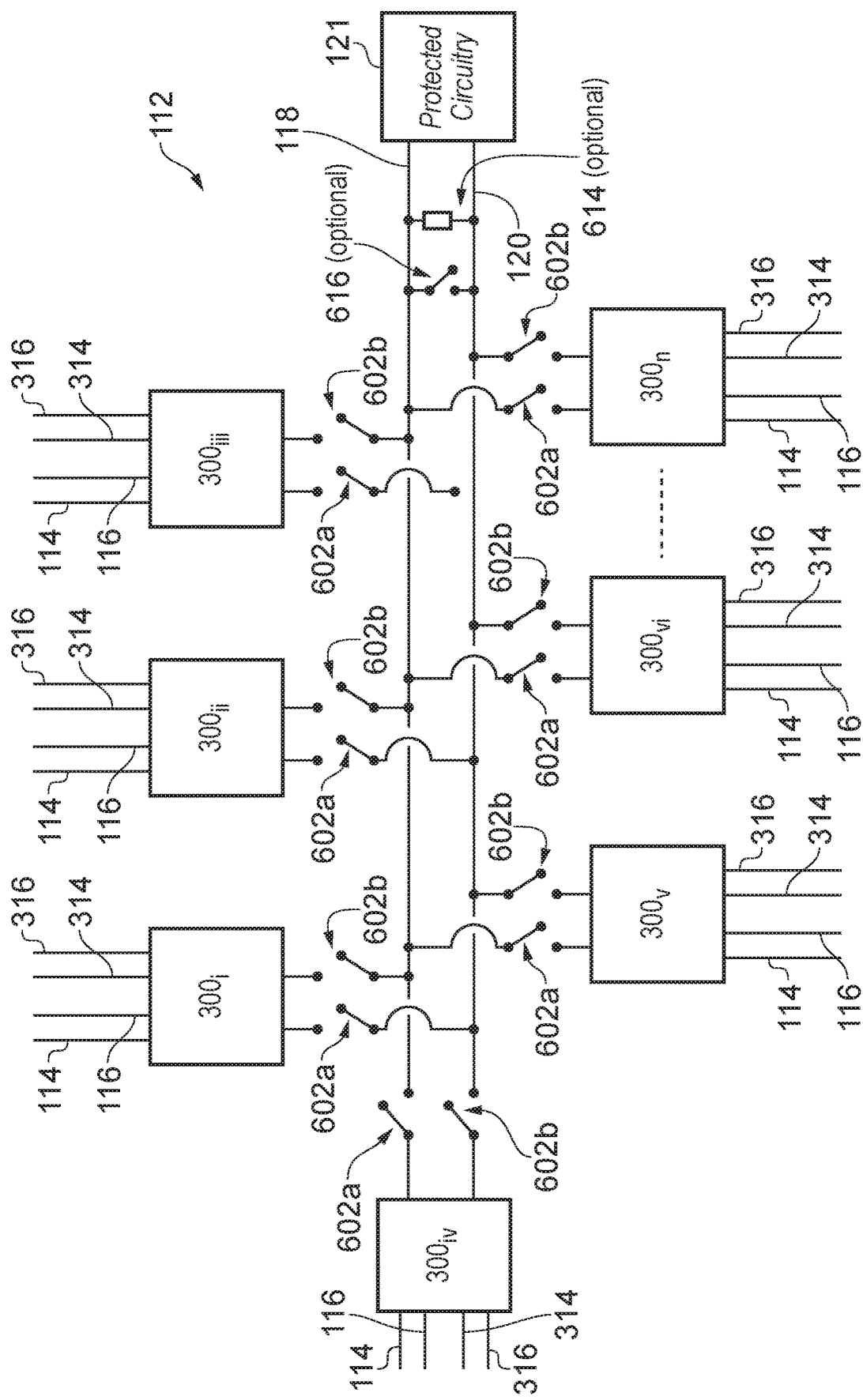
FIG. 6 illustrates a block diagram in accordance with various example implementations described herein.

FIG. 6 shows the charge storage circuitry 112 comprising a plurality of the powering units $300_i$, $300_{ii}$ . . . $300_n$ in accordance with some embodiments. Each of the plurality of powering units 300 is configured to receive the global power signals 114, 116 as an input. The powering units 300 are also optionally configured to receive the signals from the shunt loop 314, 316. A plurality of switches 602a, 602b is provided to couple the plurality of outputs from the powering units 300 to the plurality of local power signals 118 and 120. In some example embodiments, a multiplexor may replace the switches 602a and 602b to connect the plurality of powering units 300 to the protected circuitry. Some embodiments may further comprise a further optional switch 416 and optional charge store 614 arranged between the outputs of the powering units 300 and the local power supplies 118, 120. The optional switch 616 and the optional charge store 414 are arranged in parallel with their respective first terminals coupled to the first local power supply 118 and their respective second terminals coupled to the second local power supply 120. The powering units 300 may be powering units 300a or 300b or a combination of both.

In some example embodiments, a plurality of powering units 300a, 300b may be combined in parallel and series to provide a complex charge selection arrangement. In some embodiments, the number of powering units 300a, 300b in use may be selected and varied in dependence on the power requirements of the protected circuitry.

Some example embodiments may isolate the protected circuitry from the global power supply. In some example embodiments, this isolation may reduce the ability for an external side channel attack to successfully identify the variations in power or energy consumption of the protected circuitry.

In some example embodiments, the charge store may be a capacitor, a CeRAM element, an SRAM element, a form of circuitry which is capable to store charge and/or a form of circuitry which is capable of providing a large decoupling capacitance on chip.

In some example embodiments, the securing circuitry may provide one power signal and the protected circuitry may receive one or more further power signals from the external control signals.

In some example embodiments, each of the powering units 300 may be arranged to operate in one of three modes. The first mode is a power or source mode. When in the power or source mode, the powering unit 300 is coupled to the protected circuitry and/or arranged to provided power to the protected circuitry 300. The second mode is a charge mode. When in the charge mode, the powering unit is coupled to the global power supply and arranged to be charged by the global power supply.

The third mode is an optional shunt mode. When in the shunt mode, the powering unit 300 is uncoupled from the global power supply and coupled to the other capacitors and charge share, or to couple the two sides of the capacitor or multiple capacitors to ground. In some example embodiments, the shunt mode may precede the charge mode. In some example embodiments, the shunt mode may precede the power or source mode. In some example embodiments, a shunt mode may precede both the charge and source modes.

Figure 7:
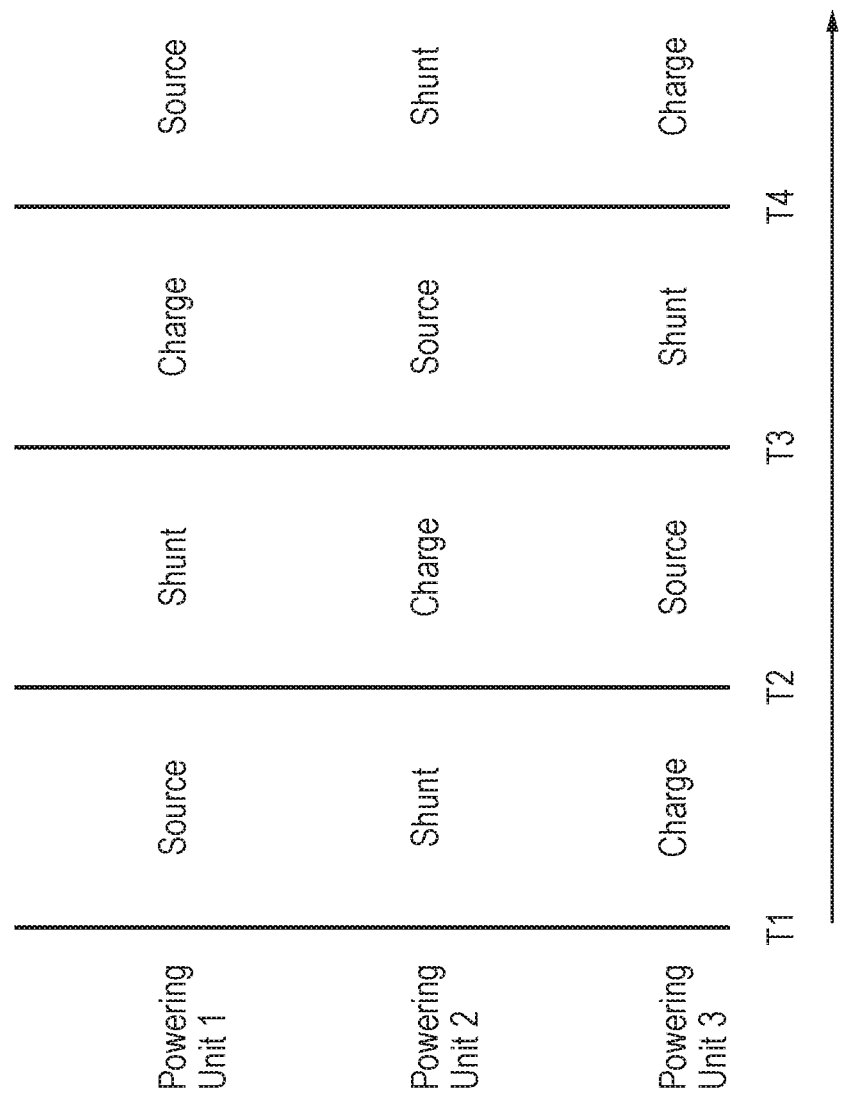
FIG. 7 illustrates a method in accordance with various example implementations described herein.

FIG. 7 shows a charging scheme in accordance with some example embodiments.

At a first timing event T1, powering unit 1 is in the source mode and coupled to the protected circuitry. Powering unit 2 is in the shunt mode and coupled to the ground or coupled to other powering units in parallel. During the shunt mode, the powering unit 2. Powering unit 3 is in the Charge mode coupled to the global power supply.

At a second timing event T2, powering unit 1 is uncoupled from the protected circuitry. Powering unit 1 has transitioned from the source mode to the shunt mode. Powering unit 2 is coupled to the global power supply and begins to charge. Powering unit 2 has transitioned from the shunt mode to the charge mode. Powering unit 3 is uncoupled from the global power supply and coupled to the protected circuitry and begins powering the protected circuitry. Powering unit 3 has transitioned from the charge mode to the source mode.

At a third timing event T3, powering unit 1 will be coupled to the global power supply and begin to recharge; powering unit 2 will be uncoupled from the global power supply and coupled to the protected circuitry. Powering unit 2 is providing power to the protected circuitry. Powering unit 3 is uncoupled from the protected circuitry and enters the shunt mode.

At a fourth timing event T4, powering units 1, 2 and 3 will revert to their original source, shunt and charge modes, respectively.

The charging scheme shown in FIG. 7 may rotate or repeat as required while the protected circuitry is in operation.

In some example embodiments, the decoupling of the powering unit from the global power supply and subsequent coupling to the protected circuitry while in shunt mode is not timing critical and may occur at any time between timing events. In some example embodiments, the coupling of the powering unit in shunt mode to the protected circuitry may be phased in dependence on a level of charge remaining in the source mode powering unit.

In some example embodiments, the timing of the transitions between modes of the powering units may be phased such that one powering unit exits the charge mode after another powering unit has entered the charge mode.

Figure 8:
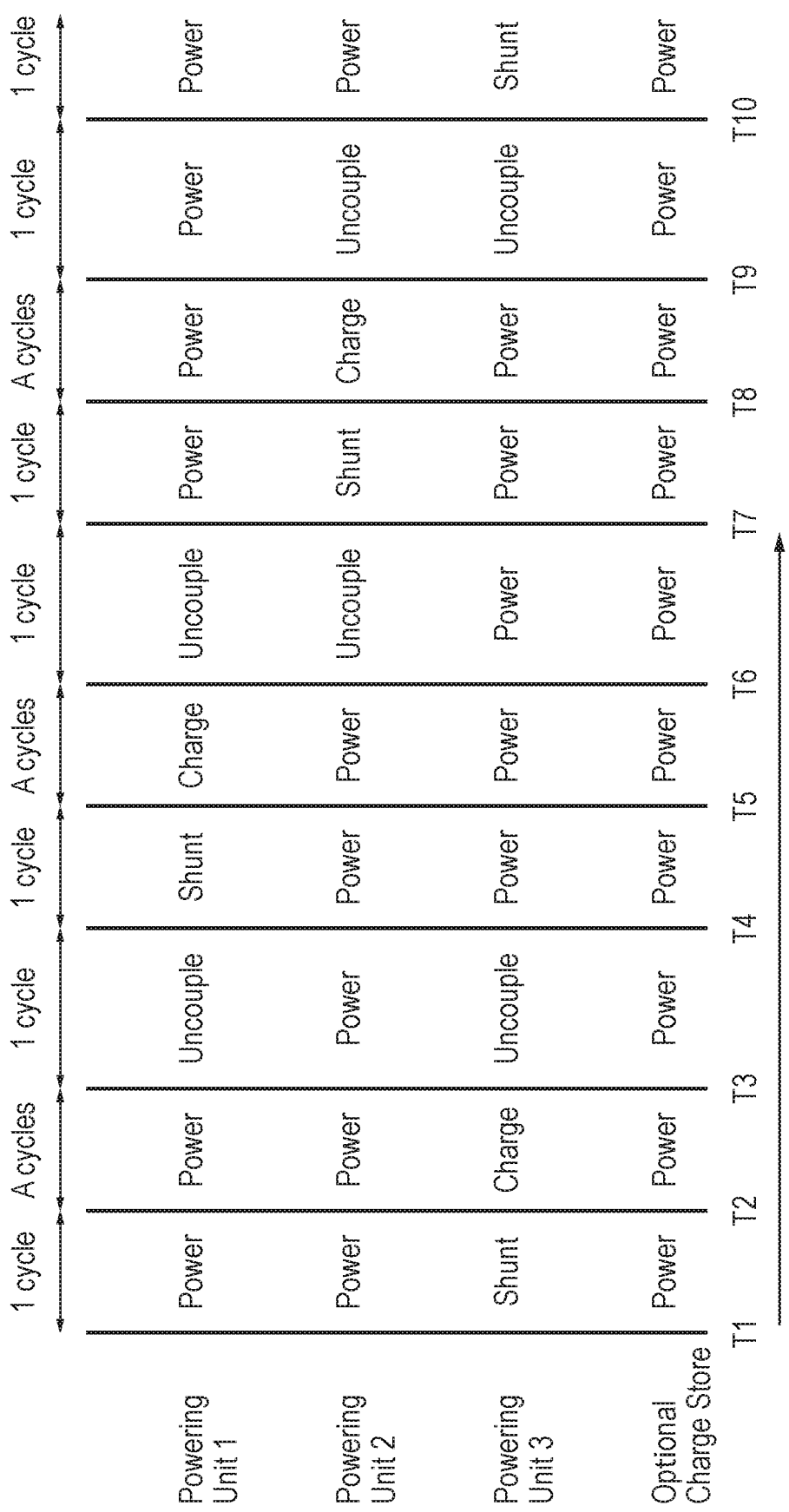
FIG. 8 illustrates a method in accordance with various example implementations described herein.

FIG. 8 shows a charging scheme in accordance with some embodiments. Embodiments which use this charging scheme may avoid any time without power to the protected circuitry.

At T1, powering units 1 and 2 provide power to the protected circuitry whist powering unit 3 is in the shunting mode.

At T2, powering units 1 and 2 provide power to the protected circuitry whist powering unit 3 is charging.

A plurality of cycles later at T3, powering unit 1 is uncoupled from the protected circuitry and therefore is no longer providing power to the protected circuitry. Powering unit continues to provide power to the protected circuitry. As powering unit 3 has finished charging, it is uncoupled from the global power supply. In some example embodiments, this stage may take 1 cycle.

One cycle later at T4, powering unit 1 enters the shunting mode; while powering units 2 and 3 provide power to the protected circuitry.

One cycle later at T5, powering unit 1 is coupled to the global power supply and begins to charge; while powering units 2 and 3 provide power to the protected circuitry.

A plurality of cycles later at T6, powering unit 1 has finished charging and is uncoupled from the global power supply and powering unit 2 is uncoupled from the protected circuitry and therefore is no longer providing power to the protected circuitry. Powering unit 3 continues to provide power to the protected circuitry.

One cycle later at T7, powering unit 2 enters the shunting mode while powering units 1 and 3 provide power to the protected circuitry.

One cycle later at T8, powering unit 2 is coupled to the global power supply and begins to charge while powering units 1 and 3 provide power to the protected circuitry.

A plurality of cycles later at T9, powering unit 2 has finished charging and is uncoupled from the global power supply and powering unit 3 is uncoupled from the protected circuitry and therefore is no longer providing power to the protected circuitry. Powering unit 1 continues to provide power to the protected circuitry.

Once cycle later at T10, the cycle repeats as at T1.

In some example embodiments, the use of the three powering units in this cyclical arrangement may enable the protected circuitry to receive uninterrupted isolated power from the powering units or charge stores for the duration of the protected mode operation.

In some example embodiments, the use of 3 powering units may be combined with a further optional charge store. This may further ensure that the protected circuitry is always coupled to a plurality of charge stores or powering units power the device. This may result in the protected circuitry never seeing or being affected by its power sources being switched out in during the same cycle.

The size of capacitors or charge stores for use in the embodiments shown in in FIG. 8 may be dependent on the number of charging cycles. The minimum number of cycles required to operate a full rotation of FIG. 8 is 3A+6 cycles, where A is number of cycles required during the charging phase. The minimum number of cycles between a powering unit being recharged may be 2A+3 cycles.

Figure 9:
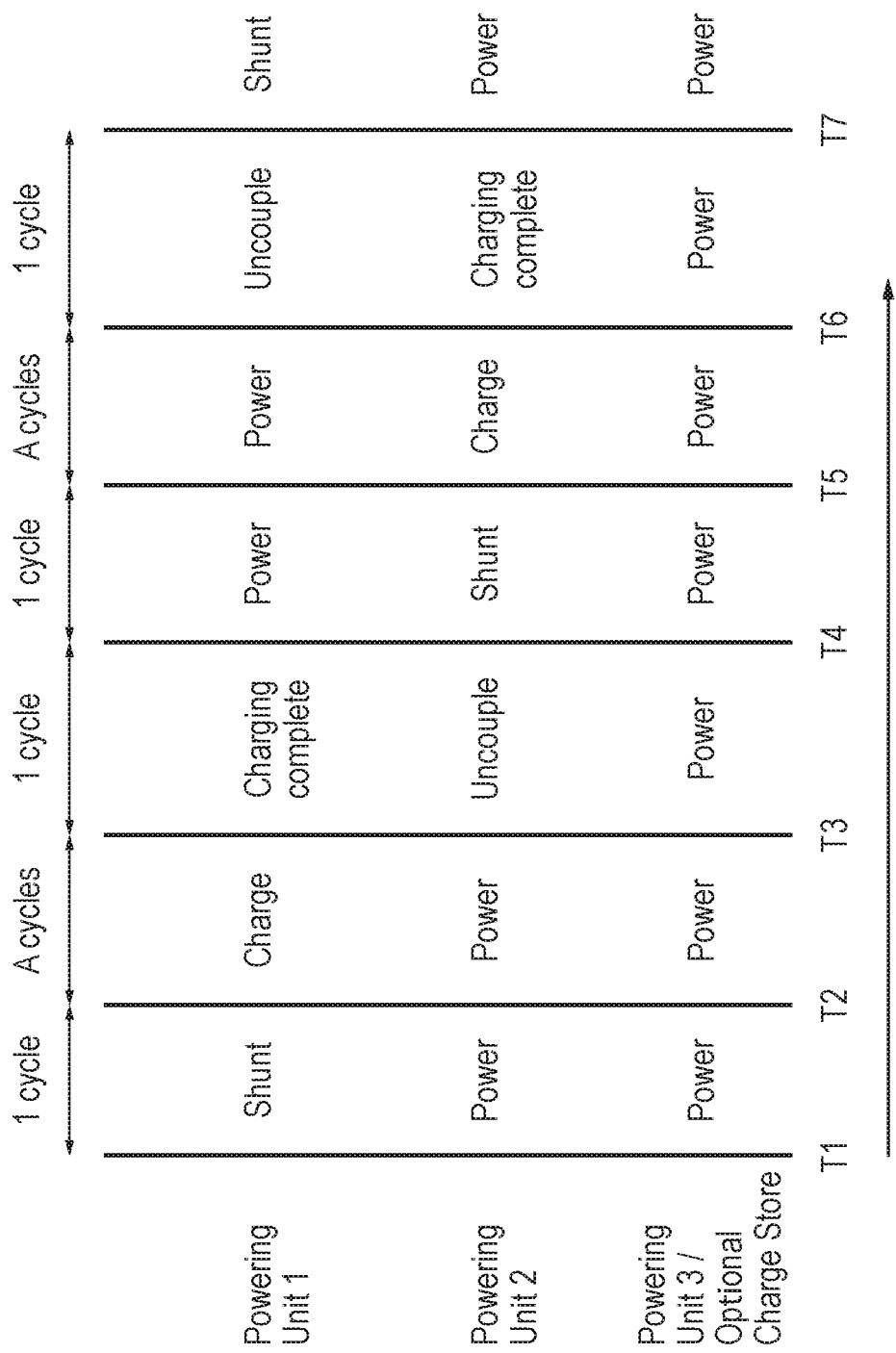
FIG. 9 illustrates a method in accordance with various example implementations described herein.

FIG. 9 shows a charging scheme in accordance with some example embodiments.

Some example embodiments of FIG. 9 may only require two charge stores or powering units in the sequence. In some example embodiments, a further charge store may remain coupled to the protected circuitry.

At time T1, the first powering unit is in the shunting mode while the second and third powering units provide power to the protected circuitry.

After one cycle at time T2, the first powering unit is coupled to the global power supply and begins to charge while the second and third powering units continue to provide power to the protected circuitry.

After a plurality of cycles at T3, the first powering unit has is finished charging and is decoupled from the global power supplies and coupled to the protected circuitry. The second powering unit is uncoupled from the protected circuitry, and the third powering unit continues to provide power to the protected circuitry.

After a further cycle at time T4, the second powering unit is in the shunting mode while the first and third powering units provide power to the protected circuitry.

After a further cycle at T5, the second powering unit is coupled to the global power supplies and begins to charge while the first and third powering units continue to provide power to the protected circuitry.

After a further plurality of cycles at T6, second powering unit has is finished charging and is decoupled from the global power supplies and coupled to the protected circuitry. The first powering unit is uncoupled from the protected circuitry, and the third powering unit continues to provide power to the protected circuitry.

After one further cycle at T7, the scheme repeats as at T1.

The size of capacitors or charge stores for use in the embodiments shown in FIG. 9 may be dependent on the number of charging cycles. The minimum number of cycles required to operate a full rotation of FIG. 9 is 2A+5 cycles, where A is number of cycles required during the charging phase. The minimum number of cycles between a powering unit being recharged may be 2A+2 cycles. In some example embodiments, the length of one cycle and/or the resilience of the protected circuitry may mean that the third powering unit or optional power store is not required.

In some example embodiments, a powering unit may provide some power to the protected circuitry while in shunt mode.

Some example embodiments may use the combination of the source and shunt powering units to more evenly distribute the unused charge. This may further obfuscate the power usage.

Some example embodiments may provide an average power level to the protected circuitry.

Some example embodiments may use of three or more charge stores rather than two on a three or more-phase charge scheme. In the three charge store scheme, two of the charge stores may power the device while the third charge store is being charged or recharged. In some example embodiments, this may reduce the interruption to processing when changing charge store by keeping a steady voltage to the device even during a switch.

In some example embodiments, the time period for charging at least one charge store or power unit may be selected at random. In some example embodiments this may comprise determining a maximum number of cycles (n) for which a charge store or power unit may charge the protected circuitry, determining a first random number $x_1$ of cycles using a random number generator, where x is less than n, charging the charge store or power unit for n-x cycles, and then determining a second random number $x_2$ of cycles during which the next power unit will be charged. In some example embodiments, the length of the uncouple cycles may be similarly varied.

In some example embodiments, a charge monitor may be used to ensure that the charge in the powering charge store or power unit being used to power the does not fall below a predetermined threshold.

In some example embodiments, the power units may comprise different sized charge stores. These may be selected to be charged and/or provide power to the protected unit randomly. In some example embodiments, some power units may be capable of discharging via the global power supply while other power units are charging via the global power supply.

Some example embodiments may cycle through the power units, using each to power the protected circuitry in turn. Some example embodiments may select the next power unit to protect the protected circuitry at random or based on a complex selection algorithm.

Some example embodiments may be capable of obfuscating the power requirements of the protected circuitry.

Some example embodiments may provide an option to switch between charge stores based on at least one of a store status or a specified time interval. In some example embodiments, switching based on a specified time interval may provide improved activity concealment. In some example embodiments, switching based on a charge store status may provide improved power consumption characteristics.

In some example embodiments, an apparatus that may monitor the voltage (or charge) on the capacitor at the end of a cycle. This measurement may be stored in a register. Upon this voltage meeting a designated voltage (or charge) this may trigger the start of the refresh of the charge store. The refresh may then be started with the charge store being shunted or shorted to a fixed lower voltage. The refresh may then be completed after the charge store has been re-charged back to a maximum voltage and is then ready to be used in subsequent cycles.

In some example embodiments, the number of cycles in which the charge store is used prior to the refresh starting may be determined in dependence on reaching a designated voltage.

In some example embodiments, the refresh may occur every time this designated voltage is achieved. Some example embodiments may measure the number of cycles taken to achieve the designated voltage and then calculate the minimum number of cycles. A plurality of refresh cycle may be needed to find a minimum. This minimum number of cycles may then establish a constant for number of cycles the charge store is used prior to refresh. In some example embodiments, this number of cycles would may be frequency dependent. Therefore, when a frequency of the processor is changed, then a new cycle minimum or charge store refresh frequency may need to be re-calculated.

In some example embodiments, the charge store refresh frequency associated with each processor frequency a may be stored for future reuse.

In some example embodiments, a starting initial charge store refresh frequency may be used while determining the actual charge store refresh frequency. In some embodiments determining a new charge store refresh frequency apparatus may enables more accurate or energy efficient designated voltage to be determined that is dependent upon the actual process. In some example embodiments, the charge store refresh frequency may be set up to maintain a constant cycle average power signature from the block cipher.

In some example embodiments, the charge stores may be continually switched before a threshold minimum charge is reached. In such embodiments, the shunting mechanism may be constructed to shunt to a minimum voltage. In some embodiments, the minimum voltage may be selectable from one of a plurality of voltages.

In some example embodiments, at least one of the charge stores may be selectively coupled to the protected circuitry by a multiplexor.

In some example embodiments, the securing circuitry may be a secure frame. In some embodiments the secure frame or securing circuitry may provide a power and electromagnetic analysis mitigation mechanism. Some embodiments may isolate selected logic circuits from the main SoC power supply or a global power supply by supplying the power to the isolated logic from on-die charge stores or capacitors.

In some example embodiments, the securing circuitry may decrease the data leakage from the protected circuitry.

Some example embodiments may provide a continual isolated power supply to protected circuitry by means of a phased coupling and decoupling of a plurality of capacitors, charge stores or powering units to the protected circuitry and to the global power supplies respectively.

In some example embodiments, the size of the charge stores or capacitors may be determined by simulating a power model of the protected circuitry. This may use activity vectors showing the highest activity rates within the circuitry.

In some example embodiments, the charge stores may have different sizes to match different power requirements of the protected circuitry.

In some example embodiments, the next charge store to be charged may be selected at random and/or the charging period may be determined at random.

In some example embodiments, mixed simulations may be performed at a plurality of Power, Voltage, and Temperature (PVT) corners to ensure that the power provided by the charge store circuitry remains above a minimum voltage.

In some embodiments a refresh cycle may comprise one or more of: a shunt, a recharge, a discharge, a discharge to a consistent level, equalizing the charge at two nodes, coupling terminals and the like.

In some example embodiments, the power may be harvested from available energy.

In some example embodiments the protected circuitry may comprise at least one of logic circuitry, digital circuitry, analogue circuitry, processing circuitry, interconnect circuitry, memory circuitry, CPUs, GPUs, systems on chip, memory controllers, interrupt controllers, caches, buffers, buses, latches, flipflops, FPGAs, register files, display processors, video processors, co-processors, accelerators, multi-processor systems, digital signal processors, networks on chip, memory management units, arbiters, and the like.

Figure 10:
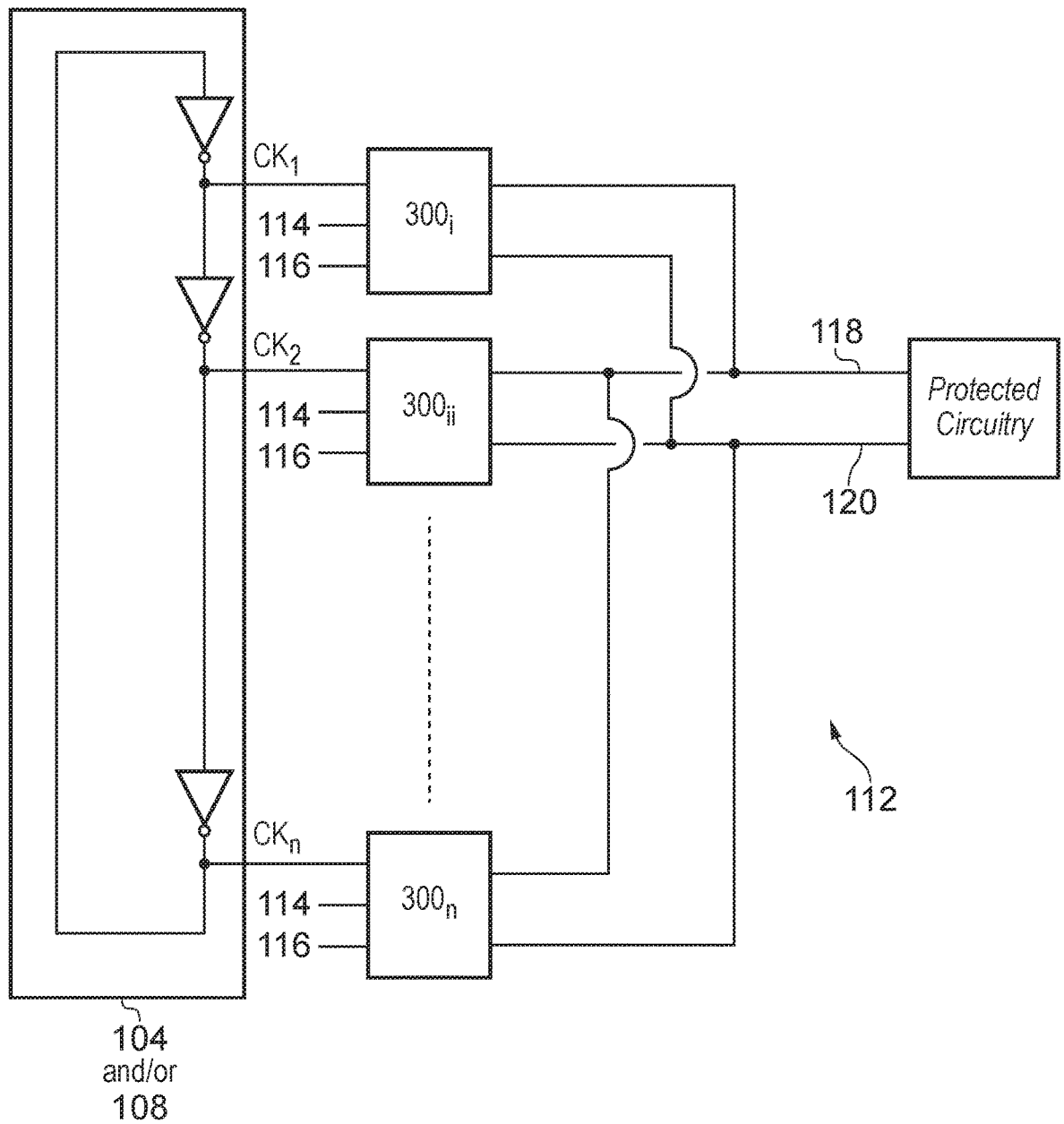
FIG. 10 illustrates a block diagram in accordance with various example implementations described herein.

FIG. 10 shows the charge storage circuitry 112 comprising a plurality of the powering units $300_i$, $300_{ii}$ ... $300_n$ in accordance with some example embodiments. Each of the plurality of powering units 300 is configured to receive the global power signals 114, 116 as an input. The powering units 300 may also optionally be configured to receive the signals from a shunt loop (not explicitly illustrated). The outputs of the powering units 300 are combined into the local power supplies 118, 120 and provided to the protected circuitry. The switches within the powering units may be controlled by the controller 110. Each of the plurality of powering units 300 is configured to receive a respective clock signal $CK_i$, $CK_2$, ..., $CK_n$. The clock signals $CK_{i-n}$ are generated by a ring oscillator which may form part of oscillator 104. Alternatively, or in addition, the ring oscillator may form part of timing circuitry 108. The provision of separate and time offset clock signals to each powering unit 300 has a result that when third switch 210 is used to erase (or at least reduce) the voltage remaining on second charge store 214 (such that information relating to the protected circuitry is further hidden) and then when the first and second switches 201, 206 are switched on the current which flows through the global power signals 114, 116 (giving an IR drop) is divided by n (the number of the plurality of powering units 300). Further the arrangement of FIG. 10 also has a result that the size of the second charge store 214 can be reduced. This is because during the load time (when the first and second switches 201, 206 are on and the fourth and fifth switches 202, 208 are off), the second charge store 214 supplies the protected circuitry. Generally the larger the capacity of the second charge store 214, the more the protected circuitry can do with its charge. With the plurality of powering units 300 providing their power offset in time from one another, the total amount of charge store capacity supplying the protected circuitry is n*(second charge store 214 capacity) plus a portion of n*(first charge store 212 capacity), where the portion depends on the ratio of phases of operation of: the first and second switches 201, 206; the fourth and fifth switches 202, 208; and the third switch 210.

FIG. 11a shows the charge storage circuitry 112 comprising a plurality of the powering units $300_i$, $300_{ii}$ ... $300_n$ in accordance with some example embodiments. Each of the plurality of powering units 300 is configured to receive the global power signals 114, 116 as an input. The powering units 300 may also optionally configured to receive the signals from a shunt loop (not explicitly illustrated). The outputs of the powering units 300 (not explicitly illustrated) are combined into the local power supplies 118, 120 and provided to the protected circuitry. The switches within the powering units may be controlled by timing circuitry 108 and/or the controller 110. Hence each powering unit may be provided with independent switch signals $SWCTRL_{i-n}$. This independence of the powering units can improve the protection of the protected circuitry.

FIG. 11b shows the charge storage circuitry 112 comprising a plurality of the powering units $300_i$, $300_{ii}$ ... $300_n$ in accordance with some example embodiments, in which each powering unit 300 is sub-divided in to a set (A-J) of smaller powering unit subunits. Accordingly FIG. 11b shows a set of powering unit subunits $300_{iA-iJ}$, through to a set of powering unit subunits $300_{nA-nJ}$. The layout of the powering subunits may take a wide variety of forms in example embodiments. To take just one example, the sets of powering subunits may be physically interleaved with one another in their layout. In some example embodiments the powering unit subunits are physically distributed in the apparatus such that at least one of the plurality of powering unit subunits for a first powering unit of the plurality of powering units is positioned between two of the plurality of powering unit subunits for a second powering unit of the plurality of powering units. Any layout configuration may be provided which distributes the plurality of powering unit subunits for a given powering unit. Note that FIG. 11b also shows each of the plurality of powering unit subunits either receiving a shared clock signal CK, or receiving a respective clock signal $CK_i$, $CK_2$, ..., $CK_n$, as may be generated by the example embodiments discussed with reference to FIG. 10. This may further obfuscate any power signatures associated with the powering units $300_i$, $300_{ii}$ ... $300_n$, since they may therefore not only be subdivided into a set of powering unit subunits which are physically distributed from one another, but also those set of powering unit subunits may operate in accordance with respective individual clock signals.

Figure 12A:
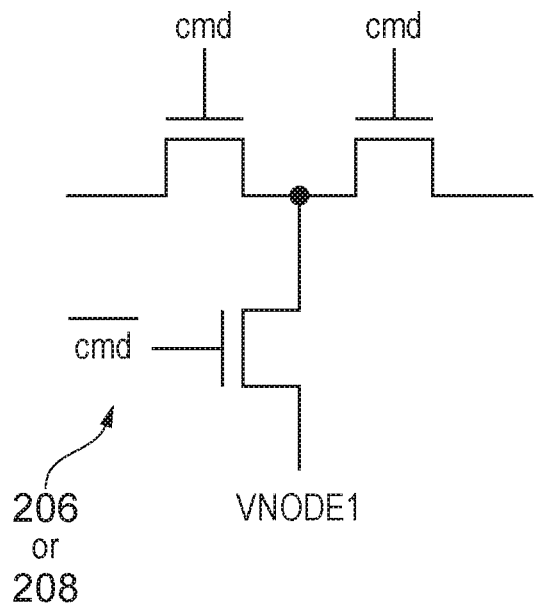
FIG. 12a illustrates a block diagram in accordance with various example implementations described herein.

FIG. 12a shows how each of the second switch 206 and the fifth switch 208 may be provided in accordance with some example embodiments. A dual switch structure of two CMOS switches in series is provided, where the middle node of the dual switch structure may be shorted to a "cold" node VNODE1. In these example embodiments, where the second switch 206 and the fifth switch 208 are connecting VSS as the second global power signal 116, an example dual switch structure of two NMOS switches is shown, which may be used for one or both of the second switch 206 and the fifth switch 208, and VNODE1 may be VDD. Connection (shorting) to VNODE1 is controlled by the inverse of the connection signal (cmd) for the second switch 206 and the fifth switch 208.

Figure 12B:
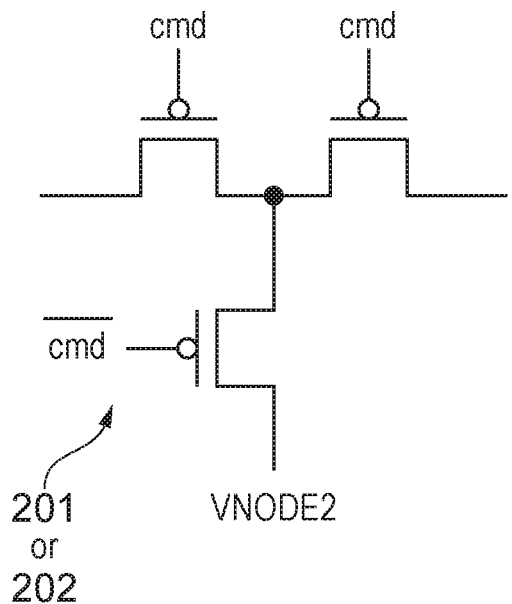
FIG. 12b illustrates a block diagram in accordance with various example implementations described herein.

FIG. 12b shows how each of the first switch 201 and the fourth switch 202 may be provided in accordance with some example embodiments. A dual switch structure of two CMOS switches in series is provided, where the middle node of the dual switch structure may be shorted to a "cold" node VNODE2. In these example embodiments, where the first switch 201 and the fourth switch 202 are connecting VDD as the first global power signal 114, an example a dual switch structure of two PMOS switches is shown, which may be used for one or both of the first switch 201 and the fourth switch 202, and VNODE2 may be VSS. Connection (shorting) to VNODE2 is controlled by the inverse of the connection signal (cmd) for the first switch 201 and the fourth switch 202.

Figure 12C:
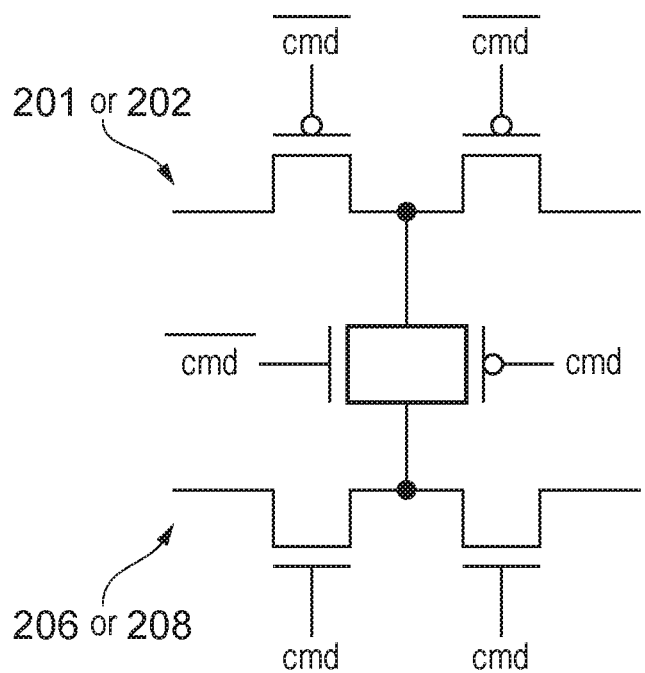
FIG. 12c illustrates a block diagram in accordance with various example implementations described herein.

The example embodiments of FIGS. 12a and 12b may also be combined as shown by the example embodiments of FIG. 12c. The arrangement of FIG. 12b forms the upper part of FIG. 12c and the arrangement of FIG. 12a forms the lower part of FIG. 12c. The nodes VNODE1 and VNODE2 are combined and represented by a virtual node formed by the pair of NMOS/PMOS switches. In these example embodiments, where the first switch 201 and the fourth switch 202 are connecting VDD as the first global power signal 114, and second switch 206 and the fifth switch 208 are connecting VSS as the second global power signal 116, the virtual node may be VDD/2.

The example embodiments of FIGS. 12a, 12b, and 12c may reduce the coupling between the global power signals 114, 116 and the local power supplies 118, 120.

Figure 13A:
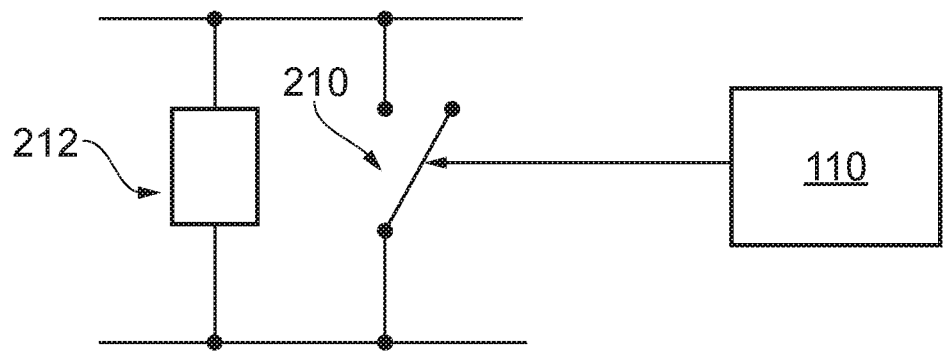
FIG. 13a illustrates a block diagram in accordance with various example implementations described herein.

FIG. 13a shows the first charge store 212, the third switch 210, and the controller 110 in accordance with some example embodiments. The controller 110 may be configured to control the operation of each of the switches in the charge storage circuitry 112 in a variety of ways, some of which have been described above. In some example embodiments the third switch 210 is used to reduce or erase the voltage that is remaining in the second charge store 214, such that this residual voltage does not provide information regarding the activity in the protected circuitry 121. Following this in a next phase when the first and second switches 201, 206 are on, the second charge store 214 is recharged. As such the majority of the power dissipation of this circuit arrangement may come from erasing and recharging the second charge store 214 every cycle. The controller 110 may be configured to control the operation of the third switch 210 to address this. For example in some example embodiments the controller 110 may be configured to vary when the third switch 210 is switched, in essence reducing the frequency with which the second charge store 214 is erased and recharged (whilst still causing the third switch to play its part in erasing and recharging the second charge store 214 sufficiently frequently to mask the power signature of the protected circuitry 121). In some example embodiments the controller 110 may be configured to reduce the voltage of the second charge store 214 by a limited amount, rather than seeking to fully erase it.

Figure 13B:
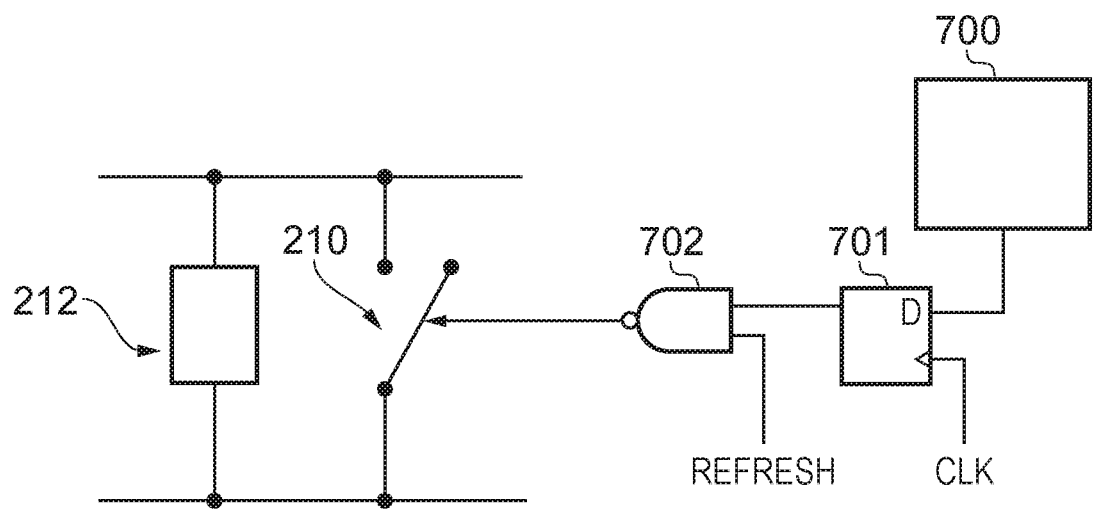
FIG. 13b illustrates a block diagram in accordance with various example implementations described herein.

FIG. 13b shows one way in which this may be achieved in some example embodiments. The first charge store 212, the third switch 210, and the controller 110 are again shown, and in addition there is a random number generator 700, a latch 701, and a NAND gate 702. The random number generator may be provided by the above mentioned random number generator or may be a separate component. The random number generator 700 provides the data (D) input to the latch 701 and the output of the latch 701 provides the input to NAND gate 702. The second input of the NAND gate 702 is a refresh signal. In other embodiments, which do not apply this randomization to the erasing of the first charge store 212, the refresh signal may directly control the third switch 210. Accordingly, the randomization supported by the example embodiments represented in in FIG. 13b is used to mask the cycles in which the third switch 210 is used to erase the first charge store 212. Hence an observer observing the charge remaining in the first charge store 212 will not be able to correlate it with the activity of the protected circuitry 121.

Figure 14A:
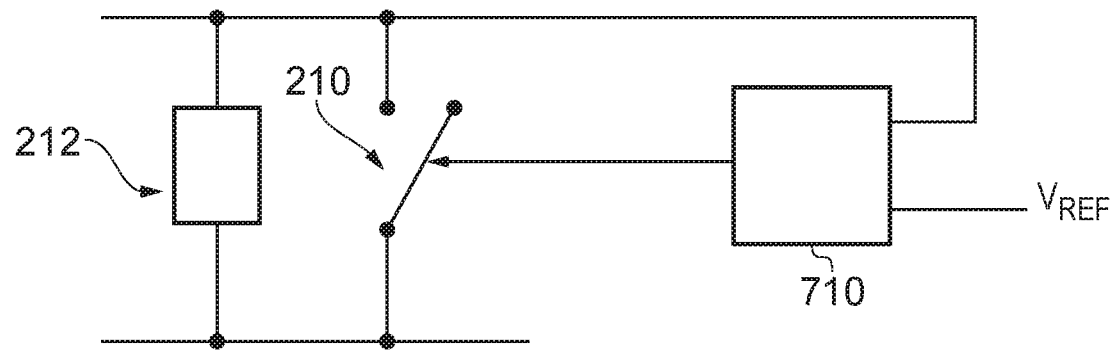
FIG. 14a illustrates a block diagram in accordance with various example implementations described herein.
Figure 14B:
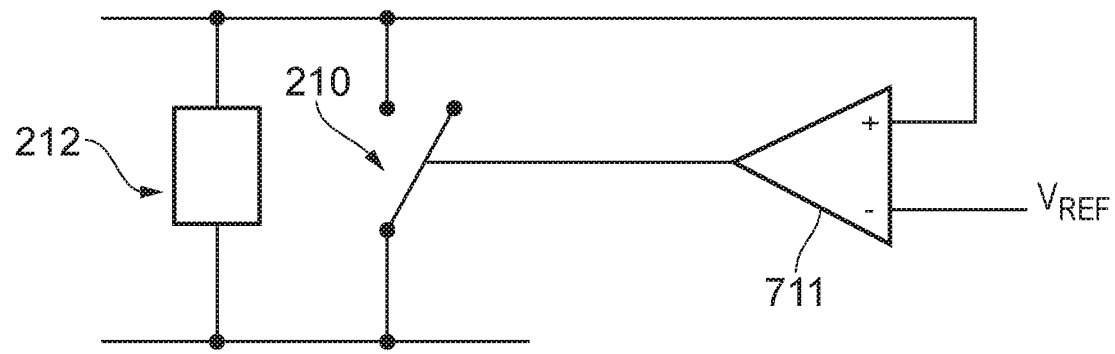
FIG. 14b illustrates a block diagram in accordance with various example implementations described herein.

FIGS. 14a and 14b show other example embodiment with a similar aim to those of FIGS. 13a and 13b, namely to avoid fully erasing and recharging the first charge store 212 at every cycle. Where the example embodiments of FIGS. 13a and 13b adopt an approach of not switching the third switch 210 at every cycle, the example embodiments of FIGS. 14a and 14b adopt a complementary approach in which the erasing (discharging) of first charge store 212 is to a reduced, but not minimum, voltage. As such the example embodiments of FIGS. 13a and 13b, and of FIGS. 14a and 14b are complementary.

FIG. 14a shows example embodiments in which a switch control 710 controls the third switch 210 with reference to a first input of a reference voltage $V_{REF}$. A second input to the switch control 710 is the voltage of the charge store 212. The switch control 710 may be arranged to control the third switch so that the first charge store 212 is discharged with reference to $V_{REF}$, for example is discharged until the voltage of the charge store 212 reaches $V_{REF}$. The voltage to which the charge store 212 is discharged (for example $V_{REF}$) is chosen to that it is above (for example by a predetermined margin) the minimum voltage that the protected circuitry 121 will tolerate in its supply.

FIG. 14b shows example embodiments in which the switch control 710 is embodied by a comparator 711, which controls the third switch 210 with reference to a first input of a reference voltage $V_{REF}$. A second input to the comparator 711 is the voltage of the charge store 212. The comparator 711 may be arranged to control the third switch, so that the first charge store 212 is discharged with reference to $V_{REF}$, for example is discharged until the voltage of the charge store 212 reaches $V_{REF}$. The voltage to which the charge store 212 is discharged (for example $V_{REF}$) is chosen to that it is above (for example by a predetermined margin) the minimum voltage that the protected circuitry 121 will tolerate in its supply.

Figure 15:
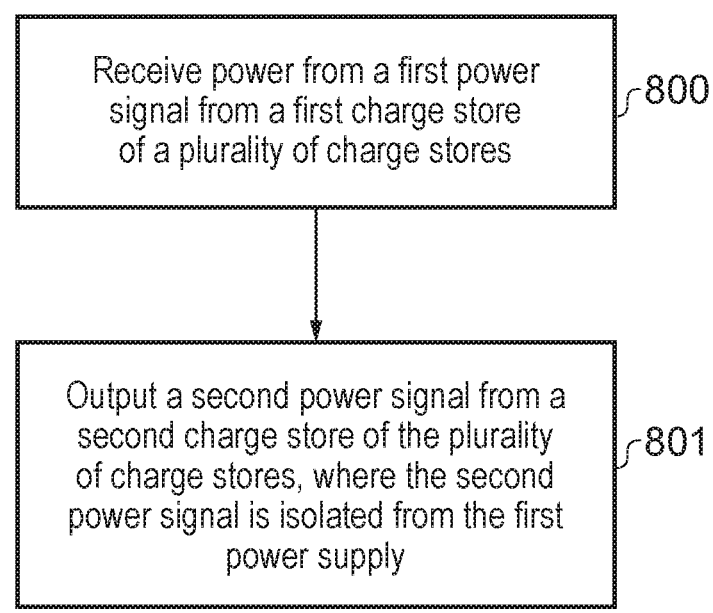
FIG. 15 illustrates a method in accordance with various example implementations described herein.

FIG. 15 illustrates a method in accordance with various example implementations described herein. At step 800 power is received from a first power signal from a first charge store of a plurality of charge stores. Then at step 801 a second power signal is output from a second charge store of the plurality of charge stores, wherein the second power signal is isolated from the first power supply.

Figure 16:
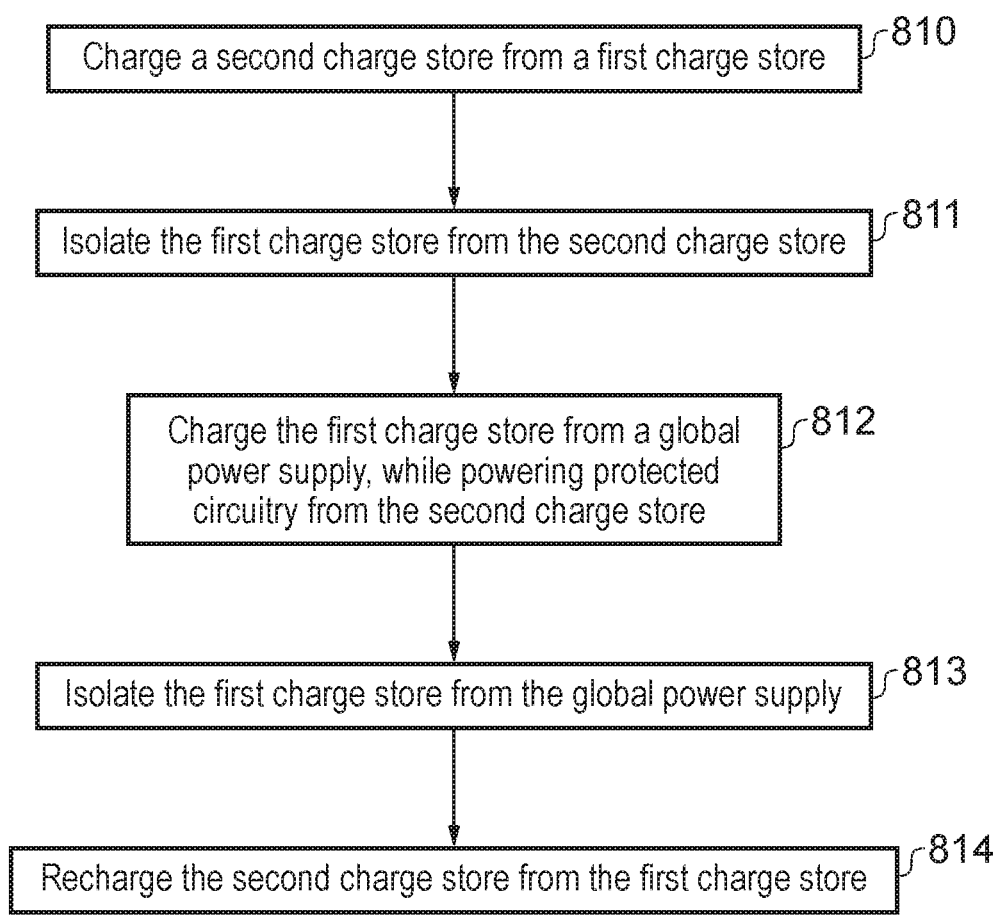
FIG. 16 illustrates a method in accordance with various example implementations described herein.

FIG. 16 illustrates a method in accordance with various example implementations described herein. At step 810 a second charge store is charged from a first charge store. At step 811 the first charge store is isolated from the second charge store. At step 812 the first charge store is charged from a global power supply while powering protected circuitry from the second charge store. At step 813 the first charge store is isolated from the global power supply. At step 814 the second charge store is recharged from the first charge store.

It will be appreciated that any one or more features from any one or more of the example embodiments described herein may be combined.

There is provided according to a first aspect an apparatus comprising; a power input; a power output; and a plurality of charge stores. A first of the plurality of charge stores is capable of receiving power from the power input, and a second of the plurality of charge stores is capable of outputting power to the power output. The first and second charge stores are arranged such that second power supply is isolated from the power input.

The apparatus may further comprise a plurality of switches capable of being coupled to at least one of the plurality of charge stores to the power input.

The apparatus may further comprise a plurality of switches capable of being selectively coupled to at least one of the plurality of charge stores to the power output.

The apparatus may be capable of operating in a plurality of modes. In a first mode, at least one the plurality of charge stores may be capable of being selectively coupled to the power input. In a second mode, at least one of the plurality of charge stores may be capable of being selectively coupled to at least one of the second charge store and the power output.

When one of the plurality of charge stores is operating in the first mode, a further of the plurality of charge stores may be operating in the second mode The plurality of charge stores may be capable of switching between the first and second modes such at least one charge store may always be operating in the second mode.

The apparatus may be capable of operating in a third mode. At least one of the plurality of charge stores may be capable of being selectively uncoupled from both the power input and the power output.

At least a third charge store of the plurality of charge stores may operate in the third mode.

The plurality of charge stores may be capable of switching between the first, second and third modes such at least one charge store may always be operating in the second mode.

The mode switching of the plurality of charges stores may be offset such that the power output is always coupled to at least one charge store.

The selective coupling of the plurality of charge stores to the power output may be dependent on at least one of a power requirement of the protected circuitry, a threshold charge level held in the charge store, a charge store charging cycle, and/or a random selection criteria.

At least one of the plurality of charge stores may be selected to be coupled to the power output dependent on at least one of: a power requirement of the protected circuitry, a threshold charge level held in the charge store, a charge store charging cycle, and/or a random selection criteria.

At least one of plurality of charge stores may be selected to be coupled to the global power supply based on at least one of: a power requirement of the protected circuitry, a threshold charge level held in the charge store; a charge store charging cycle, and/or a random selection criteria.

The duration of the coupling of the at least one of the plurality of charge stores to the power output may be dependent on at least one of: a power requirement of the protected circuitry, a threshold charge level held in the charge store, a charge store charging cycle, and/or a random selection criteria.

The duration of the coupling of the at least one of the plurality of charge stores to the global power supply may be dependent on at least one of: a power requirement of the protected circuitry, a threshold charge level held in the charge store, a charge store charging cycle, and/or a random selection criteria.

There is provided according to a second aspect a circuit comprising: a global power supply; a local power supply; protected circuitry; and securing circuitry, The securing circuitry comprises plurality of charge stores. A first of the plurality of charge stores is capable of receiving power from the power input, and a second of the plurality of charge stores is capable of outputting power to the power output. The first and second charge stores are arranged such that second power supply is isolated from the first power supply.

There is provided according to a third aspect a method comprising: receiving power from a first power signal a first of a plurality of charge stores, and outputting a second power signal from a second of the plurality of charge stores. The second power signal is isolated from the first power supply.

The method may further comprise: charging at least one of the plurality of charges stores in a charging mode, outputting power from at least one of the plurality of charge stores in a powering mode, and refreshing the charges in at least one of the plurality of charge stores in a refreshing mode.

The method may further comprise cycling at least two of the plurality of charge stores through the charging mode, powering mode and refreshing mode.

The cycling of at least some of the plurality of charges stores may be offset from one another.

There is provided according to a fourth aspect a method comprising: charging a second charge store from a first charge store; isolating the first charge store from the second charge store; charging the first charge store from a global power supply while powering protected circuitry from the second charge store; isolating the first charge store from the global power supply; and recharging the second charge store from the first charge store.

The method may further comprise isolating the first charge store from the global power supply and the second charge store and discharging the first charge store.

There is provided according to a fifth aspect an apparatus comprising; a power input; a power output; and a plurality of charge stores, wherein: a first charge store of the plurality of charge stores is capable of receiving power from the power input, a second charge store of the plurality of charge stores is capable of outputting power to the power output, and the first and second charge stores are arranged such that the power output is isolated from the power input.

The plurality of charge stores may be grouped into a plurality of powering units, wherein each of the plurality of powering units is provided with a clock signal which is phase offset with respect to a clock signal for at least one other of the other powering units.

Each of the plurality of powering units may be provided with a clock signal which is phase offset with respect to clock signals for each of the other powering units.

The apparatus may further comprise a ring oscillator capable of generating the clock signals for each of the plurality of powering units.

Each of the plurality of powering units further comprises: a first switch capable of selectively coupling at least one of the plurality of charge stores in the powering unit to the power input; and a second switch capable of selectively coupling at least one of the plurality of charge stores in the powering unit to the power output.

The apparatus may further comprising: a controller, wherein: the first switch is controlled by a first switch control signal; the second switch is controlled by a second switch control signal, wherein the first switch signal and the second switch signal are provided by the controller, and the controller is capable of providing independent first switch signals and second switch signals to each of the plurality of powering units.

At least some of the plurality of powering units may each comprise a plurality of powering unit subunits, and wherein the powering unit subunits are physically distributed in the apparatus such that at least one of the plurality of powering unit subunits for a first powering unit of the plurality of powering units is positioned between two of the plurality of powering unit subunits for a second powering unit of the plurality of powering units.

The powering unit subunits are physically distributed in the apparatus such the plurality of powering unit subunits for a first powering unit of the plurality of powering units are interleaved in position with the plurality of powering unit subunits for a second powering unit of the plurality of powering units.

The apparatus may further comprise: a switching arrangement capable of selectively coupling the first charge store of the plurality of charge stores to a power connection, wherein the first switching arrangement comprises two sub-switches coupled at a switching arrangement sub-node and a shorting sub-switch coupling the switching arrangement sub-node to a voltage node, wherein the two sub-switches are responsive to a switch signal to couple the first charge store of the plurality of charge stores to the power connection, and the shorting sub-switch is responsive to the switch signal to decouple the switching arrangement sub-node from the voltage node.

The switching arrangement may further comprise: two further sub-switches coupled at the voltage node and a second shorting sub-switch coupling voltage node to the switching arrangement sub-node, wherein the two further sub-switches are responsive to the switch signal to couple the first charge store of the plurality of charge stores to the power connection, and the second shorting sub-switch is responsive to the switch signal to decouple the switching arrangement sub-node from the voltage node.

The power connection may be the power input.

The power connection may be at least one of the second charge store and the power output.

The two sub-switches and the shorting sub-switch may be complementary types of CMOS switches.

The first shorting sub-switch and the second shorting sub-switch may be complementary types of CMOS switches.

The apparatus may further comprise a shunt switch responsive to a refresh signal to cause a discharge of the first charge store.

The apparatus may further comprise: a timing controller capable of generating a refresh enable signal in coordination with timing control of receipt of power by the first charge store from the power input and of output of power from the second charge store to the power output; and a timing randomization source capable of generating a randomization timing signal, wherein the refresh signal is generated in dependence on the refresh enable signal and the randomization timing signal.

The apparatus may further comprise: a voltage comparator capable of generating the refresh signal in dependence on a voltage difference between a second charge store voltage and a reference voltage.

The reference voltage may be set to exceed a minimum requirement voltage of the power output by a predetermined margin.

There is provided according to a sixth aspect a method comprising: receiving power from a first power signal from a first charge store of a plurality of charge stores; and outputting a second power signal from a second charge store of the plurality of charge stores, wherein the second power signal is isolated from the first power supply.

There is provided according to a seventh aspect a method comprising: charging a second charge store from a first charge store; isolating the first charge store from the second charge store; charging the first charge store from a global power supply while powering protected circuitry from the second charge store; isolating the first charge store from the global power supply; and recharging the second charge store from the first charge store.

Other example configurations may thus be described as set out in the following numbered clauses:

1. An apparatus comprising;
   a power input;
   a power output; and
   a plurality of charge stores;
   wherein:
   a first of the plurality of charge stores is capable of receiving power from the power input,
   a second of the plurality of charge stores is capable of outputting power to the power output, and
   the first and second charge stores are arranged such that second power supply is isolated from the power input.

2. The apparatus of clause 1, further comprising:
   a plurality of switches capable of being selectively coupled to at least one of the plurality of charge stores to the power input.

3. The apparatus of clause 1, further comprising:
   a plurality of switches capable of being to selectively coupled to at least one of the plurality of charge stores to the power output.

4. The apparatus of clause 1, wherein:
   in a first mode, at least one the plurality of charge stores is capable of being selectively coupled to the power input, and
   in a second mode, at least one of the plurality of charge stores is capable of being selectively coupled to at least one of the second charge store and the power output.

5. The apparatus of clause 4, wherein when one of the plurality of charge stores is operating in the first mode, a further of the plurality of charge stores is operating in the second mode.

6. The apparatus of clause 5, wherein the plurality of charge stores is configured to switch between the first and second modes such at least one charge store is always operating in the second mode.

7. The apparatus of clause 5, wherein in a third mode, at least one of the plurality of charge stores is capable of being selectively uncoupled from both the power input and the power output.

8. The apparatus of clause 6, wherein at least a third charge store of the plurality of charge stores operates in the third mode.

9. The apparatus of clause 3, wherein the selective coupling of the plurality of charge stores to the power output is dependent on at least one of:
   a power requirement of the protected circuitry;
   a threshold charge level held in the charge store;
   a charge store charging cycle; or
   a random selection criteria.

10. The apparatus of clause 1, wherein at least one of the plurality of charge stores are selected to be coupled to the power output is dependent on at least one of:
a power requirement of the protected circuitry;
a threshold charge level held in the charge store;
a charge store charging cycle; or
a random selection criteria.

11. The apparatus of clause 1, wherein the at least one of plurality of charge stores are selected to be coupled to the global power supply is dependent on at least one of:
a power requirement of the protected circuitry;
a threshold charge level held in the charge store;
a charge store charging cycle; or
a random selection criteria.

12. The apparatus of clause 1, wherein the duration of the coupling of the at least one of the plurality of charge stores to the power output is dependent on at least one of:
a power requirement of the protected circuitry;
a threshold charge level held in the charge store;
a charge store charging cycle; or
a random selection criteria.

13. The apparatus of clause 1, wherein the duration of the coupling of the at least one of the plurality of charge stores to the global power supply is dependent on at least one of:
a power requirement of the protected circuitry;
a threshold charge level held in the charge store;
a charge store charging cycle; or
a random selection criteria.

14. A circuit comprising:
a global power supply;
a local power supply;
protected circuitry; and
securing circuitry having a plurality of charge stores, wherein:
   a first of the plurality of charge stores is capable of receiving power from the power input; and
   a second of the plurality of charge stores is capable of outputting power to the power output; and
   the first and second charge stores are arranged such that second power supply is isolated from the first power supply.

15. A method comprising:
receiving power from a first power signal a first of a plurality of charge stores; and
outputting a second power signal from a second of the plurality of charge stores,
wherein the second power signal is isolated from the first power supply.

16. The method of clause 15, further comprising:
charging at least one of the plurality of charges stores in a charging mode;
outputting power from at least one of the plurality of charge stores in a powering mode; and
refreshing the charges in at least one of the plurality of charge stores in a refreshing mode.

17. The method of clause 16, further comprising:
cycling at least two of the plurality of charge stores through the charging mode, powering mode, and refreshing mode.

18. The method of clause 17, wherein the cycling of at least some of the plurality of charges stores are offset from one another.

19. A method comprising:
charging a second charge store from a first charge store;
isolating the first charge store from the second charge store;
charging the first charge store from a global power supply while powering protected circuitry from the second charge store;
isolating the first charge store from the global power supply; and
recharging the second charge store from the first charge store.

20. The method of clause 19, further comprising:
isolating the first charge store from the global power supply and the second charge store; and
discharging the first charge store.

Further, the description provided herein may be considered directed to certain specific example implementations. It should be understood that the description provided herein is provided for the purpose of enabling a person with ordinary skill in the art to make and use any subject matter defined herein by the subject matter of the claims. The subject matter of the claims shall not be limited to the implementations and illustrations provided herein, but includes modified forms of those implementations including portions of implementations and combinations of elements of different implementations in accordance with the claims. It should be appreciated that in the development of any such example implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the example embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

What is claimed is:

1. An apparatus comprising;
   a power input comprising a first global power signal line and a second global power signal line distinct from the first global power signal line;
   a power output comprising a first local power signal line and a second local power signal line distinct from the first local power signal line; and
   a plurality of charge stores, wherein:
   a first charge store of the plurality of charge stores is configured to receive power from the power input while a second charge store of the plurality of charge stores is either receiving power from the power input or providing power to the power output,
   the second charge store of the plurality of charge stores is configured to output power to the power output while the first charge store is either receiving power from the power input or providing power to the power output, and
   the first and second charge stores are arranged such that the first global power signal line and the second global power signal line are isolated from the first local power signal line and the second local power signal line.

2. The apparatus of claim 1, wherein the plurality of charge stores are grouped into a plurality of powering units, wherein each of the plurality of powering units is provided with a clock signal which is phase offset with respect to a clock signal for at least one other of the other powering units.

3. The apparatus of claim 2, wherein each of the plurality of powering units is provided with a clock signal which is phase offset with respect to clock signals for each of the other powering units.

4. The apparatus of claim 3, further comprising a ring oscillator configured to generate the clock signals for each of the plurality of powering units.

5. The apparatus of claim 2, wherein each of the plurality of powering units further comprises:
   a first switch configured to selectively couple at least one of the plurality of charge stores in the powering unit to the power input; and
   a second switch configured to selectively couple at least one of the plurality of charge stores in the powering unit to the power output.

6. The apparatus of claim 5, further comprising:
   control circuitry, wherein:
   the first switch is controlled by a first switch control signal;
   the second switch is controlled by a second switch control signal,
   wherein the first switch signal and the second switch signal are provided by the control circuitry, and
   the control circuitry is configured to provide independent first switch signals and second switch signals to each of the plurality of powering units.

7. The apparatus of claim 2, wherein at least some of the plurality of powering units each comprise a plurality of powering unit subunits, and
   wherein the powering unit subunits are physically distributed in the apparatus such that at least one of the plurality of powering unit subunits for a first powering unit of the plurality of powering units is positioned between two of the plurality of powering unit subunits for a second powering unit of the plurality of powering units.

8. The apparatus of claim 7, wherein the powering unit subunits are physically distributed in the apparatus such the plurality of powering unit subunits for a first powering unit of the plurality of powering units are interleaved in position with the plurality of powering unit subunits for a second powering unit of the plurality of powering units.

9. The apparatus of claim 1, further comprising:
   a first switching arrangement configured to selectively couple the first charge store of the plurality of charge stores to a power connection,
   wherein the first switching arrangement comprises two sub-switches coupled at a switching arrangement sub-node and a shorting sub-switch coupling the switching arrangement sub-node to a voltage node,
   wherein the two sub-switches are responsive to a switch signal to couple the first charge store of the plurality of charge stores to the power connection,
   and the shorting sub-switch is responsive to the switch signal to decouple the switching arrangement sub-node from the voltage node.

10. The apparatus of claim 9, wherein the switching arrangement further comprises:
    two further sub-switches coupled at the voltage node and a second shorting sub-switch coupling voltage node to the switching arrangement sub-node,
    wherein the two further sub-switches are responsive to the switch signal to couple the first charge store of the plurality of charge stores to the power connection,
    and the second shorting sub-switch is responsive to the switch signal to decouple the switching arrangement sub-node from the voltage node.

11. The apparatus of claim 9, wherein the power connection is the power input.

12. The apparatus of claim 9, wherein the power connection is at least one of the second charge store and the power output.

13. The apparatus of claim 9, wherein the two sub-switches and the shorting sub-switch are complementary types of CMOS switches.

14. The apparatus of claim 10, wherein the first shorting sub-switch and the second shorting sub-switch are complementary types of CMOS switches.

15. The apparatus of claim 1, further comprising a shunt switch responsive to a refresh signal to cause a discharge of the first charge store.

16. The apparatus of claim 15, further comprising:
timing control circuitry configured to generate a refresh enable signal in coordination with timing control of receipt of power by the first charge store from the power input and of output of power from the second charge store to the power output; and
a timing randomization source configured to generate a randomization timing signal,
wherein the refresh signal is generated in dependence on the refresh enable signal and the randomization timing signal.

17. The apparatus of claim 15, further comprising:
a voltage comparator configured to generate the refresh signal in dependence on a voltage difference between a second charge store voltage and a reference voltage.

18. The apparatus of claim 17, wherein the reference voltage is set to exceed a minimum requirement voltage of the power output by a predetermined margin.

19. The apparatus of claim 1 wherein the first and second charge stores are arranged such that a second voltage of the power output is substantially equal to a first voltage of the power input.

20. A method comprising:
receiving power from a first power signal line comprising a first global power signal line and a second global power signal line for a first charge store of a plurality of charge stores; and
outputting a second power signal comprising a first local power signal line and a second local power signal line from a second charge store of the plurality of charge stores,
wherein the first global power signal line is distinct from the second global power signal line, and the first local power signal line is distinct from the second local power signal line,
wherein the receiving power for the first signal power input can occur while the outputting the second power signal from the second charge store occurs or while receiving power for the second charge store,
wherein outputting the second power signal from the second charge store can occur while the receiving power for the first charge store from the first power signal occurs or while the first charge store is outputting power, and
wherein the first global power signal line and the second global power signal line are isolated from the first local power signal line and the second local power signal line.

21. A method comprising:
charging a second charge store from a first charge store;
isolating the first charge store from the second charge store;
charging the first charge store from a global power supply comprising a first global power signal line and a second global power signal line while powering protected circuitry from a first local power signal line and a second local power signal line output from the second charge store,
wherein the first global power signal line is distinct from the second global power signal line, and the first local power signal line is distinct from the second local power signal line;
isolating the first charge store from the global power supply; and
recharging the second charge store from the first charge store,
wherein the first charge store can be charged from the global power supply while the second charge store is either being charged or is powering the protected circuitry,
wherein the second charge store can power the protected circuitry while the first charge store is either being charged from the global power supply or powering the protected circuitry, and
wherein the first global power signal line and the second global power signal line are isolated from the first local power signal line and the second local power signal line.

* * * * *